(12) United States Patent
Ekstrand et al.

(10) Patent No.: US 11,995,747 B2
(45) Date of Patent: May 28, 2024

(54) METHOD FOR GENERATING IDENTIFICATION PATTERN AND TERMINAL DEVICE

(71) Applicant: HUAWEI TECHNOLOGIES CO., LTD., Shenzhen (CN)

(72) Inventors: Simon Ekstrand, Lund (SE); Zongbo Wang, Nanjing (CN); Johan Larsby, Lund (SE); Liyuan Qiao, Shenzhen (CN); Jingzhou Du, Shenzhen (CN); Xueyan Huang, Shenzhen (CN); Guolang Li, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 442 days.

(21) Appl. No.: 17/350,625

(22) Filed: Jun. 17, 2021

(65) Prior Publication Data

US 2021/0312679 A1 Oct. 7, 2021

Related U.S. Application Data

(63) Continuation of application No. PCT/CN2019/124205, filed on Dec. 10, 2019.

(30) Foreign Application Priority Data

Dec. 19, 2018 (CN) .......................... 201811555766.0

(51) Int. Cl.
*G06T 11/60* (2006.01)
*G06F 9/451* (2018.01)
*G06T 11/20* (2006.01)

(52) U.S. Cl.
CPC .............. *G06T 11/60* (2013.01); *G06F 9/454* (2018.02); *G06T 11/203* (2013.01)

(58) Field of Classification Search
CPC ......... G06T 11/60; G06T 11/203; G06F 9/454
See application file for complete search history.

(56) References Cited

U.S. PATENT DOCUMENTS

| 8,332,413 | B1 * | 12/2012 | Li ..................... H04M 1/72403 707/769 |
| 2008/0069447 | A1 | 3/2008 | Hotta et al. |
| 2018/0322112 | A1 * | 11/2018 | Bellegarda .............. G06F 40/44 |

FOREIGN PATENT DOCUMENTS

| CN | 102096933 A | * | 6/2011 |
| CN | 102096933 A | | 6/2011 |

(Continued)

OTHER PUBLICATIONS

Tzyzxxdjzx, How to use ps to make grid word wallpaper, Baidu experience, Feb. 12, 2018, https://jingyan.baidu.com/article/cbcede07657cb502f40b4de0.html, 13 pages.

(Continued)

*Primary Examiner* — Umair Ahsan
(74) *Attorney, Agent, or Firm* — HAUPTMAN HAM, LLP

(57) ABSTRACT

A method for generating an identification pattern, a terminal device, and the like are provided. The method includes: obtaining a first image (110), where the first image is used to represent any one of a Chinese character, an English character, and an Arabic numeral character; performing transformation on the first image based on a contour line of the first image to obtain a second image (120), where the second image includes the first image and a plurality of contour lines; and generating an identification pattern of a software program based on the second image (130). This application can improve a display effect of the identifier pattern.

16 Claims, 21 Drawing Sheets

(56) References Cited

FOREIGN PATENT DOCUMENTS

| | | | |
|---|---|---|---|
| CN | 104503742 A | | 4/2015 |
| CN | 105468574 A | | 4/2016 |
| CN | 106534518 A | | 3/2017 |
| CN | 107818323 A | | 3/2018 |
| CN | 108830275 A | | 11/2018 |
| CN | 109816743 A | | 5/2019 |
| KR | 20150122324 A | * | 6/2015 |

OTHER PUBLICATIONS

International Search Report issued in corresponding International Application No. PCT/CN2019/124205, dated Mar. 10, 2020, pp. 1-11.
Chinese Office Action issued in corresponding Chinese Application No. 201811555766.0, dated Nov. 11, 2022, pp. 1-64.

* cited by examiner

Second image      Identification pattern

Identification patten      Contact avatar

Hide some lines

Hide a part of a pattern by a geometric shape

At the beginning of a call 5 minutes after the call starts 10 minutes after the call starts 30 minutes after the call starts First image    Superimposed image    Second image Second image    Identification pattern Lock screen Calendar Memo Reminder event Playlist cover Voice assistant Multi-person recording screen

佛山相册   暑假相册

Album cover

METHOD FOR GENERATING IDENTIFICATION PATTERN AND TERMINAL DEVICE

CROSS-REFERENCE TO RELATED APPLICATIONS

This application is a continuation of International Application No. PCT/CN2019/124205, filed on Dec. 10, 2019, which claims priority to Chinese Patent 201811555766.0, filed on Dec. 19, 2018. The disclosures of the aforementioned applications are hereby incorporated by reference in their entireties.

TECHNICAL FIELD

This application relates to the field of terminal device technologies, and more specifically, to a method for generating an identification pattern and a terminal device.

BACKGROUND

A software program in a terminal device often uses a corresponding identification pattern to represent an icon of the software program or information displayed inside the software program. For example, a contact in an address book is often provided with a contact avatar. A main purpose of providing a contact avatar is to improve a display effect of contact information, distinguish different contacts, and improve user experience in viewing the contact information.

In a conventional solution, an image of a Chinese character in the name of a contact or a character image of the first letter of a pinyin name of a contact is generally extracted as an avatar of the contact. For example, for a contact surnamed Zhou, a character image of the Chinese character "周" may be directly used as an avatar of the contact, or a character image of the first letter "Z" of the pinyin Zhou of the Chinese character may be used as an avatar of the contact.

A display mode of directly extracting the character image as the contact avatar in the conventional solution is monotonous, with a poor display effect and corresponding user experience to be improved.

SUMMARY

This application provides a method for generating an identification pattern and a terminal device to improve a display effect of the identification pattern.

According to a first aspect, a method for generating an identification pattern is provided. The method includes: obtaining a first image, where the first image is used to represent any one of a Chinese character, an English character, and an Arabic numeral character;
performing transformation on the first image based on a contour line of the first image to obtain a second image, where the second image includes the first image and a plurality of contour lines; and generating an identification pattern of the software program based on the second image.

In some implementations, the identification pattern is the second image.

In other implementations, the identification pattern is a part of the second image.

Optionally, the identification pattern includes the second image and another image, or the identification pattern is obtained through transformation from the second image.

Optionally, the software program is any one of an address book, a memo, a calendar, a weather application, a music player, and an album.

Optionally, the obtaining a first image includes: obtaining the first image based on display information of the software program.

Specifically, when the software program is the address book, the first image may be obtained through contact information in the address book.

Optionally, before the performing transformation on the first image based on a contour line of the first image, the method further includes: obtaining the contour line of the first image according to an edge detection algorithm.

The contour line of the first image may be an outer contour line of the first image, or may be an inner contour line of the first image.

The outer contour line of the first image may be a contour line formed around a peripheral edge (or an overall edge) of the first image.

The inner contour line of the first image may be a contour line formed by a plurality of edges of the first image.

Further, the inner contour line of the first image may be a contour line formed by all edges of the first image.

In this application, transformation is performed on the first image, so that the second image including the plurality of contour lines can be obtained, and further the identification pattern of the software program with more diverse display styles can be obtained based on the second image. This can improve a display effect of the identification pattern and user experience to some extent.

With reference to the first aspect, in some implementations of the first aspect, the performing transformation on the first image based on a contour line of the first image to obtain a second image includes: extending the outer contour line of the first image towards a periphery of the first image to obtain the second image, where the outer contour line of the first image is a contour line formed around the peripheral edge of the first image.

The outer contour line is extended towards the periphery of the first image, so that the second image including the first image and a plurality of outer contour lines around the first image can be obtained.

It should be understood that when the first image is either a solid character image or a hollow character image, the second image can be obtained by extending the outer contour line towards the periphery of the first image.

The outer contour line of the first image is extended towards the periphery of the first image, so that the second image with a larger image area can be obtained, and the identification pattern of the software program can be generated more flexibly based on the second image.

With reference to the first aspect, in some implementations of the first aspect, the first image is the hollow character image, and the performing transformation on the first image based on a contour line of the first image to obtain a second image includes: extending an inner contour line of the first image towards an interior of the first image to obtain the second image, where the inner contour line of the first image is a contour line formed by the plurality of edges of the first image.

With reference to the first aspect, in some implementations of the first aspect, the first image is the solid character image, and the extending an inner contour line of the first image towards an interior of the first image to obtain the second image includes: performing transformation on the first image to obtain a transformed first image, where the transformed first image is a hollow character image; and extending an inner contour line of the transformed first image towards an interior of the transformed first image to obtain the second image.

With reference to the first aspect, in some implementations of the first aspect, the contour line of the first image is a right-angled contour line, and before the performing transformation on the first image based on a contour line of the first image, the method further includes: processing the contour line of the first image to obtain a processed first image, where a contour line of the processed first image is a rounded contour line; and the performing transformation on the first image based on a contour line of the first image to obtain a second image includes: performing transformation on the processed first image based on the rounded contour line to obtain the second image.

In this application, the right-angled contour line of the first image is transformed into the rounded contour line, so that the second image with the rounded contour line can be obtained. This can improve a display effect of the identification pattern of the software program generated from the second image.

With reference to the first aspect, in some implementations of the first aspect, the identification pattern is an image of a hot spot of the second image, where the image of the hot spot of the second image is a sub-image in the second image from which a character represented by the second image can be recognized.

Optionally, the generating an identification pattern of the software program based on the second image includes: determining an image of a partial region of the second image as the identification pattern of the software program.

The partial region may be a central region of the second image, and the central region of the second image may be a region extending a specific distance towards a periphery of the second image along a geometric center of the second image.

The image of the partial region or the image of the hot spot of the second image is used as the identification pattern of the software program, so that a more concise identification pattern can be obtained, and the display effect of the identification pattern can be improved.

With reference to the first aspect, in some implementations of the first aspect, the software program is an address book, and the identification pattern of the software program is a contact avatar in the address book.

It should be understood that when the identification pattern of the software program is the contact avatar in the address book, the contact avatar may also be used as a caller ID interface.

With reference to the first aspect, in some implementations of the first aspect, a density of contour lines in the identification pattern is positively correlated with a contact frequency and/or a degree of intimacy of a contact represented by the identification pattern.

In this application, the density of the contour lines in the identification pattern may be used to identify contacts with different contact frequencies or different degrees of intimacy. The display effect is better.

With reference to the first aspect, in some implementations of the first aspect, a shade of color of the identification pattern is positively correlated with a contact frequency and/or a degree of intimacy of a contact represented by the identification pattern.

In this application, the shade of color of the identification pattern may be used to identify contacts with different contact frequencies or different degrees of intimacy. The display effect is better.

With reference to the first aspect, in some implementations of the first aspect, the software program is an album (which may be an album application displayed on a main interface, or may be a single album in an album application), and the identification pattern of the software program is a pattern of an album cover; or the software program is a memo, and the identification pattern of the software program is an identification pattern of memo information in the memo; or the software program is a music application, and the identification of the software program is a cover of a playlist in the music application; or the software program is a voice assistant, and the identification pattern of the software program is a display icon of the voice assistant; or the software program is a recording application, and the identification pattern of the software program is an avatar of a recordee; or the software program is a weather application, and the identification pattern of the software program is a display icon of the weather application.

According to a second aspect, a method for generating an identification pattern is provided. The method includes: obtaining a first image, where the first image is used to represent any one of a Chinese character, an English character, and an Arabic numeric character, and the first image is a hollow character image; superimposing a dot-matrix image or a line image on the first image to obtain a superimposed image; moving some pixels in a dot matrix or a line of the superimposed image by a preset distance to obtain a second image; and generating an identification pattern of the software program based on the second image.

In this application, the dot-matrix image or the line image is superimposed on the first image, so that the second image with more diverse display styles can be obtained, and further the identification pattern of the software program with more diverse display styles can be obtained based on the second image. This can improve a display effect of the identification pattern and user experience to some extent.

Optionally, the moving some pixels in a dot matrix or a line in the superimposed image by a preset distance includes: moving the pixels in the superimposed image that are located in an outer contour line of the first image by the preset distance.

When moving some pixels in the superimposed image, an image located in the outer contour line of the first image may be first moved in a direction (which may be, for example, a horizontal direction) by a distance, and then moved in another direction (which may be, for example, a vertical direction) by a distance.

With reference to the second aspect, in some implementations of the second aspect, the identification pattern is an image of a hot spot of the second image, where the image of the hot spot of the second image is a sub-image in the second image from which a character represented by the second image can be recognized.

Optionally, the generating an identification pattern of the software program based on the second image includes: determining an image of a partial region of the second image as the identification pattern of the software program.

The partial region may be a central region of the second image. The central region of the second image may be a region extending a specific distance towards a periphery of the second image along a geometric center of the second image.

The image of the partial region or the image of the hot spot of the second image is used as the identification pattern of the software program, so that a more concise identification pattern can be obtained, and a display effect can be improved.

With reference to the second aspect, in some implementations of the second aspect, the software program is an address book, and the identification pattern of the software program is a contact avatar in the address book.

With reference to the second aspect, in some implementations of the second aspect, a density of dot matrices or lines in the identification pattern is positively correlated with a contact frequency and/or a degree of intimacy of a contact represented by the identification pattern.

In this application, the density of the dot matrices or lines in the identification pattern may be used to identify contacts with different contact frequencies or different degrees of intimacy. The display effect is better.

With reference to the second aspect, in some implementations of the second aspect, a shade of color of the identification pattern is positively correlated with a contact frequency and/or a degree of intimacy of a contact represented by the identification pattern.

In this application, the shade of color of the identification pattern may be used to identify contacts with different contact frequencies or different degrees of intimacy. The display effect is better.

With reference to the second aspect, in some implementations of the second aspect, the software program is an album, and the identification pattern is a pattern of an album cover; or the software program is a memo, and the identification pattern of the software program is an identification pattern of memo information in the memo; or the software program is a music application, and the identification of the software program is a cover of a playlist in the music application; or the software program is a voice assistant, and the identification pattern of the software program is a display icon of the voice assistant; or the software program is a recording application, and the identification pattern of the software program is an avatar of a recordee; or the software program is a weather application, and the identification pattern of the software program is a display icon of the weather application.

According to a third aspect, a method for generating an identification pattern is provided. The method includes: obtaining a first image, where the first image is used to represent an English character or an Arabic numeral character; determining a target picture that matches the first image from a picture library, where the target picture includes a reference image whose similarity with the first image is greater than or equal to a preset similarity; and generating an identification pattern of the software program based on the reference image.

In this application, the picture that matches the first picture is selected from the picture library. Because the picture includes richer patterns, an identification pattern with richer styles can be obtained based on the reference image in the target picture, and a display effect of the identification pattern can be improved.

With reference to the third aspect, in some implementations of the third aspect, the identification pattern is an image of a hot spot of the reference image, where the image of the hot spot of the reference image is a sub-image in the reference image from which a character represented by the reference image can be recognized.

Optionally, the generating an identification pattern of the software program based on the reference image includes: determining an image of a partial region of the reference image as the identification pattern of the software program.

The partial region may be a central region of the reference image, and the central region of the reference image may be a region extending a specific distance towards a periphery of the reference image along a geometric center of the reference image.

The image of the partial region or the image of the hot spot of the reference image is used as the identification pattern of the software program, so that a more concise identification pattern of the software program can be obtained, and a display effect can be improved.

With reference to the third aspect, in some implementations of the third aspect, texture distribution of pictures in the picture library meets characteristics of the Golden Mean or the Fibonacci sequence.

In this application, because the texture distribution of the pictures in the picture library meets the characteristics of the Golden Mean or the Fibonacci sequence, the identification pattern of the software program finally obtained from the pictures in the picture library is aesthetic and can provide better user experience.

With reference to the third aspect, in some implementations of the third aspect, the software program is an address book, and the identification pattern of the software program is a contact avatar in the address book; or the software program is an album, and the identification pattern is a pattern of an album cover; or the software program is a memo, and the identification pattern of the software program is an identification pattern of memo information in the memo; or the software program is a music application, and the identification of the software program is a cover of a playlist in the music application; or the software program is a voice assistant, and the identification pattern of the software program is a display icon of the voice assistant; or the software program is a recording application, and the identification pattern of the software program is an avatar of a recordee; or the software program is a weather application, and the identification pattern of the software program is a display icon of the weather application.

According to a fourth aspect, a terminal device is provided, and the terminal device includes modules configured to perform the method according to any one of the first aspect or the possible implementations of the first aspect.

According to a fifth aspect, a terminal device is provided, and the terminal device includes modules configured to perform the method according to any one of the second aspect or the possible implementations of the second aspect.

According to a sixth aspect, a terminal device is provided, and the terminal device includes modules configured to perform the method according to any one of the third aspect or the possible implementations of the third aspect.

According to a seventh aspect, a terminal device is provided, including a memory and a processor, where the memory is configured to store a program, the processor is configured to execute the program stored in the memory, and when the program stored in the memory is executed by the processor, the processor is configured to perform the method according to any one of the first aspect and the implementations of the first aspect.

According to an eighth aspect, a terminal device is provided, including a memory and a processor, where the memory is configured to store a program, the processor is configured to execute the program stored in the memory, and when the program stored in the memory is executed by the processor, the processor is configured to perform the method according to any one of the second aspect and the implementations of the second aspect.

According to a ninth aspect, a terminal device is provided, including a memory and a processor, where the memory is configured to store a program, the processor is configured to execute the program stored in the memory, and when the program stored in the memory is executed by the processor, the processor is configured to perform the method according to any one of the third aspect or the implementations of the third aspect.

Optionally, the memory is a non-volatile memory.

Optionally, the memory and the processor are coupled with each other.

According to a tenth aspect, a computer readable storage medium is provided, and the computer readable storage medium is configured to store program code, and when the program code is executed by a computer, the computer is configured to perform the method according to any one of the first aspect or the implementations of the first aspect.

According to an eleventh aspect, a computer readable storage medium is provided, and the computer readable storage medium is configured to store program code, and when the program code is executed by a computer, the computer is configured to perform the method according to any one of the second aspect or the implementations of the second aspect.

According to a twelfth aspect, a computer readable medium is provided, and the computer readable medium is configured to store program code, and when the program code is executed by a computer, the computer is configured to perform the method according to any one of the third aspect or the implementations of the third aspect.

Optionally, the computer readable storage medium may be located in a terminal device, and the program code stored in the computer readable storage medium may be executed by the terminal device.

When the program code stored in the computer readable storage medium is executed by the terminal device, the terminal device can perform the method according to the implementations in any one of the first aspect, the second aspect, and the third aspect.

According to a thirteenth aspect, a chip is provided, and the chip includes a processor, where the processor is configured to perform the method according to any one of the first aspect or the implementations of the first aspect.

According to a fourteenth aspect, a chip is provided, and the chip includes a processor, where the processor is configured to perform the method according to any one of the second aspect or the implementations of the second aspect.

According to a fifteenth aspect, a chip is provided, and the chip includes a processor, where the processor is configured to perform the method according to any one of the third aspect or the implementations of the third aspect.

Optionally, the chip is installed inside a terminal device.

According to a sixteenth aspect, a computer program (or a computer program product) for enabling a computer or a terminal device to perform the method according to any one of the first aspect or the implementations of the first aspect.

According to a seventeenth aspect, a computer program (or a computer program product) for enabling a computer or a terminal device to perform the method according to any one of the second aspect or the implementations of the second aspect.

According to an eighteenth aspect, a computer program (or a computer program product) for enabling a computer or a terminal device to perform the method according to any one of the third aspect or the implementations of the third aspect.

Optionally, the computer program may be stored in the terminal device, and the computer program may be executed by the terminal device.

When the terminal device executes the computer program, the terminal device can perform the method according to the implementations in any one of the first aspect, the second aspect, and the third aspect.

DESCRIPTION OF EMBODIMENTS

The following describes technical solutions of this application with reference to accompanying drawings.

A method for generating an identification pattern in this application may be performed by a terminal device. The terminal device may be a mobile terminal (for example, a smart phone), a computer, a personal digital assistant, a wearable device, a vehicle-mounted device, an Internet of Things device, or the like. In addition, the terminal device may alternatively be another device capable of displaying an image.

The terminal device may be a device running various operating systems. For example, the terminal device may be a device running an Android system, or may be a device running an iOS system, or may be a device running a Windows system.

In a conventional solution, a software program in the terminal device usually directly selects a character image (a Chinese character, an English character or other language character) as a corresponding display icon. For example, in an address book of the terminal device, a character image of a character in a name or a character image of a first letter of a pinyin name of a contact is generally selected (before being used as an identification pattern, the character image may be subjected to some artistic processing, for example, background filling in a random color) as an identification pattern of the contact (or as a display avatar of the contact). Types of the identification pattern generated in this way are limited, and a display effect is moderate.

Therefore, to generate an identification pattern with a better display effect, this application proposes a new method for generating an identification pattern. Transformation is performed on an image based on a contour line of an extracted image, and an identification pattern of a software program is generated based on an image obtained through transformation, so that more different identification patterns can be generated. In this way, the display effect can be improved, and user experience is enhanced.

Figure 1:
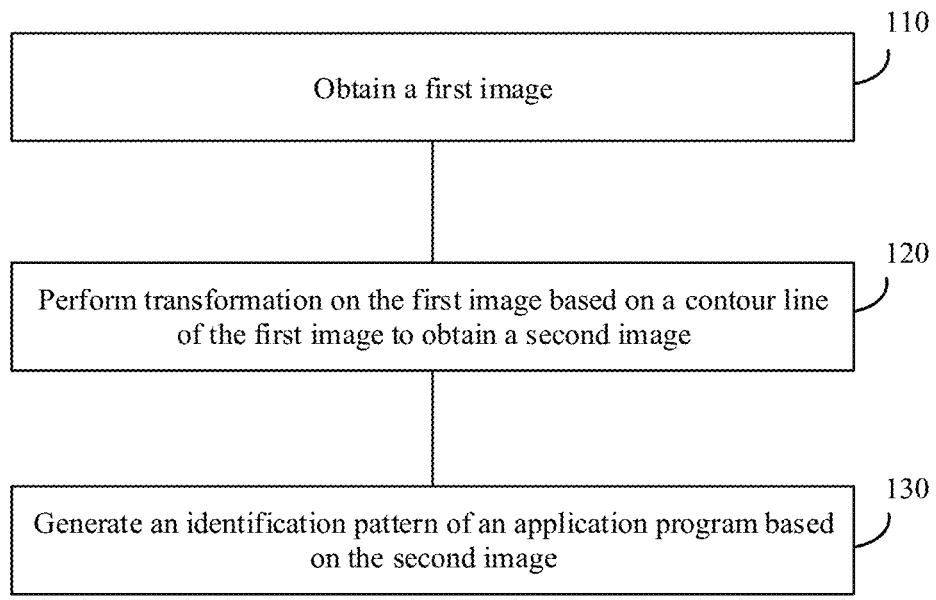
FIG. 1 is a schematic flowchart of a method for generating an identification pattern according to an embodiment of this application.

The following describes in detail the method for generating an identification pattern in the embodiments of this application with reference to FIG. 1.

FIG. 1 is a schematic flowchart of a method for generating an identification pattern according to an embodiment of this application. The method shown in FIG. 1 may be performed by a terminal device. The method shown in FIG. 1 includes steps 110 to 130. The following describes the steps 110 to 130 in detail.

110: Obtain a first image.

The first image may be used to represent any one of a Chinese character, an English character, and an Arabic numeral character.

In step 110, the first image may be obtained based on a software program. Specifically, the first image may be obtained based on display information of the software program.

For example, if the software program currently displays a Chinese character, the first image may be an image for representing the Chinese character. The first image may be pre-stored or may be obtained from a network in real time.

It should be understood that the software program may be a software program in the terminal device.

Specifically, the software program may be an address book, a memo, a calendar, a weather application, a music player, an album, or the like.

When the software program is the address book, the first image may be obtained based on contact information in the address book. For example, if a contact is surnamed 周, a character image of "周" may be obtained as the first image.

When the software program is the weather application, the first image may be obtained based on a temperature displayed in the weather application. For example, when the temperature displayed in the weather application is 28° C., a character image of "28" may be selected as the first image.

When the software program is the memo, the first image may be obtained based on memo information in the memo. For example, a character image of a first character in a piece of memo information in the memo may be extracted as the first image.

120: Perform transformation on the first image based on a contour line of the first image to obtain a second image.

The second image includes the first image and a plurality of contour lines.

The contour line of the first image may be an outer contour line of the first image, or may be an inner contour line of the first image. The outer contour line or the inner contour line of the first image may be obtained through an edge detection algorithm.

The outer contour line of the first image may be a contour line formed around a peripheral edge (or an overall edge) of the first image.

Figure 2:
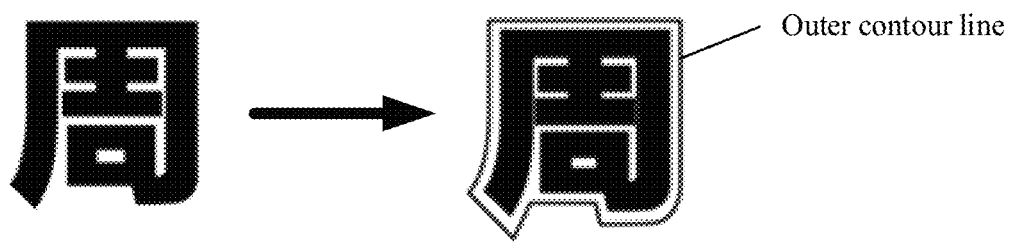
FIG. 2 is a schematic diagram of obtaining an outer contour line of a character image according to an embodiment of this application.

For example, as shown in FIG. 2, when a character image of "周" is a solid character image, the character image of "周" and its outer contour line are shown on the left and right of FIG. 2 respectively.

FIG. 2 shows only the outer contour line formed when the character image of "周" is a solid character image, an outer contour line formed when the character image of "Zhou" is a hollow character image is similar to that shown in FIG. 2, and the outer contour is still the contour line formed around the peripheral edge of the character image.

The inner contour line of the first image may be a contour line formed by a plurality of edges of the first image.

Figure 3:
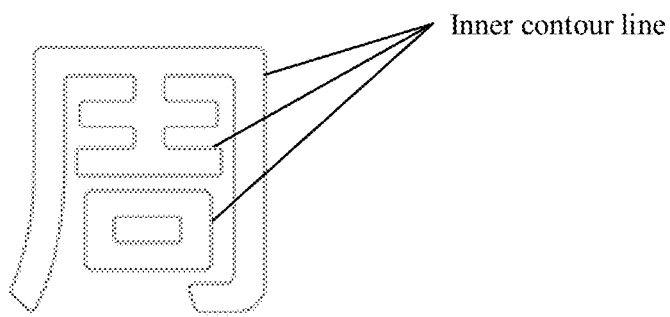
FIG. 3 is a schematic diagram of an inner contour line of a character image according to an embodiment of this application.

Generally, when the character image is a hollow character image, the character image has an inner contour line. For example, as shown in FIG. 3, the character image of "周" is a hollow character image, and inner contour lines of the character image of "周" are all edge lines forming the character image.

In the foregoing step 120, the performing transformation on the first image based on a contour line of the first image may be copying a plurality of contour lines to an interior or a periphery of the first image based on the contour line of the first image.

The following describes in detail the manners of performing transformation on the first image based on a contour line of the first image.

A transformation manner 1: Extend the outer contour line of the first image towards the periphery of the first image to obtain the second image.

In the transformation manner 1, the extending the outer contour line of the first image towards the periphery of the first image may be copying the outer contour line of the first image towards the periphery of the first image. One or more (at least one) outer contour lines may be copied towards the periphery of the first image.

Figure 4:
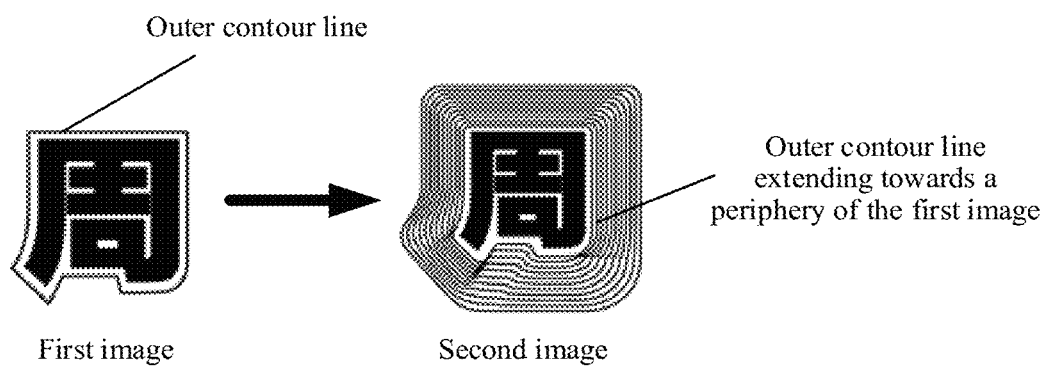
FIG. 4 is a schematic diagram of obtaining a second image based on a solid character image.

For example, as shown in FIG. 4, the first image is a character image of a Chinese character "周", and the second image shown on the right side of FIG. 4 may be obtained by performing transformation on the first image in the transformation manner 1. It can be seen from FIG. 4 that the second image includes the first image and a plurality of outer contour lines around the first image.

When the first image is either a solid character image or a hollow character image, the transformation manner 1 may be used to perform transformation on the first image.

A transformation manner 2: Extend the inner contour line of the first image towards the interior of the first image to obtain the second image.

Extending the inner contour line of the first image towards the interior of the first image may also be called indentation of the inner contour line of the first image, that is, copying the inner contour line of the first image towards the interior of the first image. When the inner contour line of the first image is copied towards the first image, one or more lines may be copied.

Figure 5:
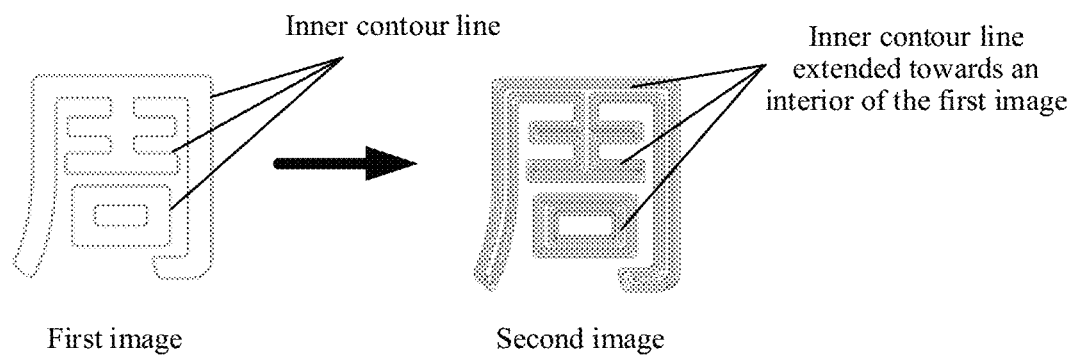
FIG. 5 is a schematic diagram of obtaining a second image based on a hollow character image.

For example, as shown in FIG. 5, the first image is a character image of a Chinese character "周", and the second image shown on the right side of FIG. 5 may be obtained by performing transformation on the first image in the transformation manner 2. It can be seen from FIG. 5 that the second image includes the first image and a plurality of inner contour lines inside the first image.

When the first image is a hollow character image, the transformation manner 2 may be used to perform transformation on the first image. When the first image is a solid character image, transformation may be performed on the first image to obtain a transformed first image, where the transformed first image is a hollow character image. Then the transformation manner 2 may be used to perform transformation on the transformed first image to obtain the second image.

Figure 6:
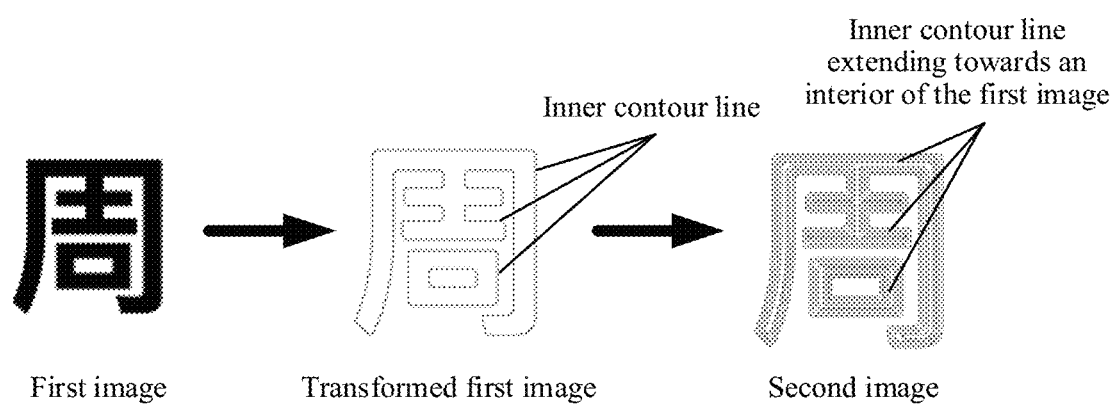
FIG. 6 is a schematic diagram of obtaining a second image based on a solid character image.

Specifically, as shown in FIG. 6, the first image is a solid character image. After transformation is performed on the first image, the transformed first image is obtained; and then an inner contour line of the transformed first image is extended towards the interior of the first image to obtain the second image.

130: Generate an identification pattern of the software program based on the second image.

In step 130, the second image may be directly used as the identification pattern of the software program, or an image in a central region of the second image may be selected as the identification pattern of the software program, or an image of a hot spot region of the second image may be selected as the identification pattern of the software program.

In this application, transformation is performed on the first image, so that the second image including the plurality of contour lines can be obtained, and further the identification pattern of the software program with more diverse display styles can be obtained based on the second image. This can improve a display effect of the identification pattern and user experience to some extent.

To further improve the display effect, when the contour line of the first image is a right-angled contour line, the contour line of the first image may be processed to obtain a processed first image, where a contour line of the processed first image is a rounded contour line; and then transformation is performed on the processed first image based on the rounded contour line to obtain the second image.

Figure 7:
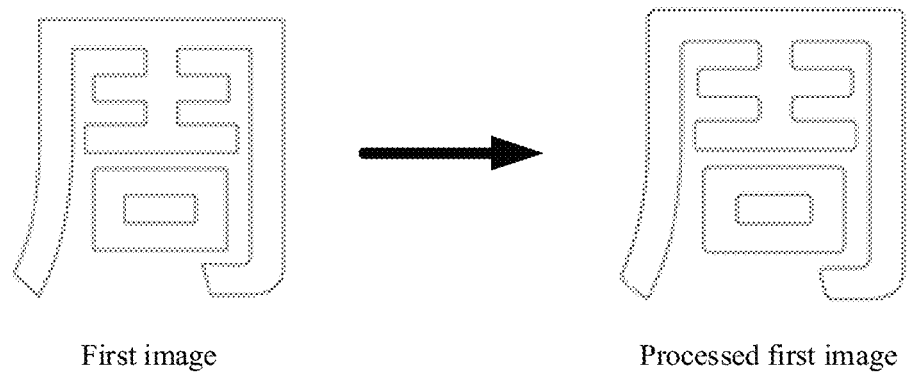
FIG. 7 is a schematic diagram of processing a right-angled contour line of a first image to obtain a rounded contour line.

As shown in FIG. 7, the contour line of the first image is a right-angled contour line. The processed first image may be obtained by processing the contour line of the first image (specifically, fillet processing may be performed on the contour line of the first image), and a contour line of the processed first image is a filleted contour line.

In this application, the right-angled contour line of the first image is transformed into the rounded contour line, so that the second image with the rounded contour line can be obtained. This can improve a display effect of the identification pattern of the software program generated from the second image.

It should be understood that when the identification pattern of the software program is generated based on the second image, the second image may be directly used as the identification pattern of the software program.

To obtain a more concise identification pattern, a part of an image in the second image may alternatively be selected as the identification pattern of the software program. For example, the image in the central region of the second image may be selected as the identification pattern of the software program, and the central region of the second image may be a region extending a specific distance towards a periphery of the second image along a geometric center of the second image.

Optionally, in an embodiment, the identification pattern is an image of a hot spot of the second image.

The image of the hot spot of the second image is a sub-image in the second image from which a character represented by the second image can be recognized. A region in which the image is captured from the second image may also be referred to as a visual hot spot.

Figure 8:
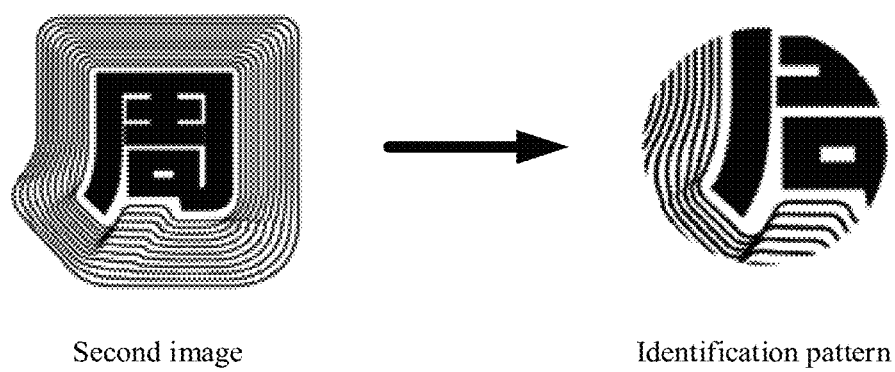
FIG. 8 is a schematic diagram of generating an identification pattern based on a second image.

For example, as shown in FIG. 8, because the second image includes a lot of contour lines, it is not concise enough (or may be unaesthetic) if the second image is directly used as the identification pattern of the software program. To improve a display effect, an image of a partial region in the second image may be used as the identification pattern, and it can be recognized from the image in the identification pattern that the second image represents the Chinese character "周".

Optionally, a neural network model may be used to identify and capture the image of the hot spot of the second image.

Specifically, a preset quantity of character images may be selected, and images of hot spots of these character images may be manually captured to form a character image training set. The character image training set is input into the neural model for training. After training, the terminal device can have an ability to recognize and capture the images of the hot spots in the preset quantity of character images. In this way, when the obtained second image is an image in the preset quantity of character images, the terminal device can recognize and capture the images of the hot spots in the second image.

In addition, during the training, the training pictures may also include images generated by the terminal device in a process of generating the identification pattern.

Optionally, in an embodiment, the software program is an address book, and the identification pattern of the software program is a contact avatar in the address book.

Figure 9:
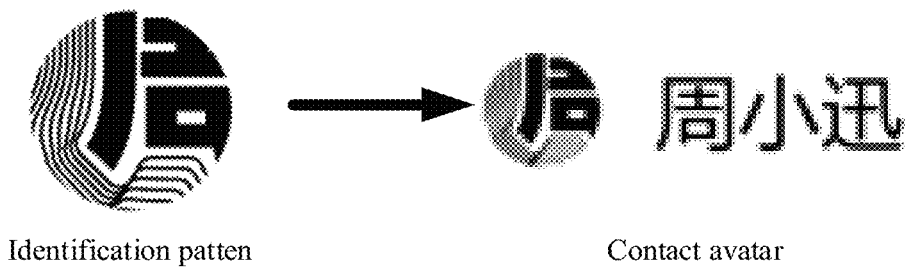
FIG. 9 is a schematic diagram of using an identification pattern as a contact avatar.

For example, as shown in FIG. 9, after the identification pattern is obtained, the identification pattern may be used as the contact avatar. If the identification pattern is relatively large, the identification pattern may be compressed, and then the compressed identification pattern is used as the contact avatar.

In addition, when the identification pattern of the software program is the contact avatar in the address book, if a call from this contact is received, the contact avatar may also be used as a caller ID screen.

Figure 10:
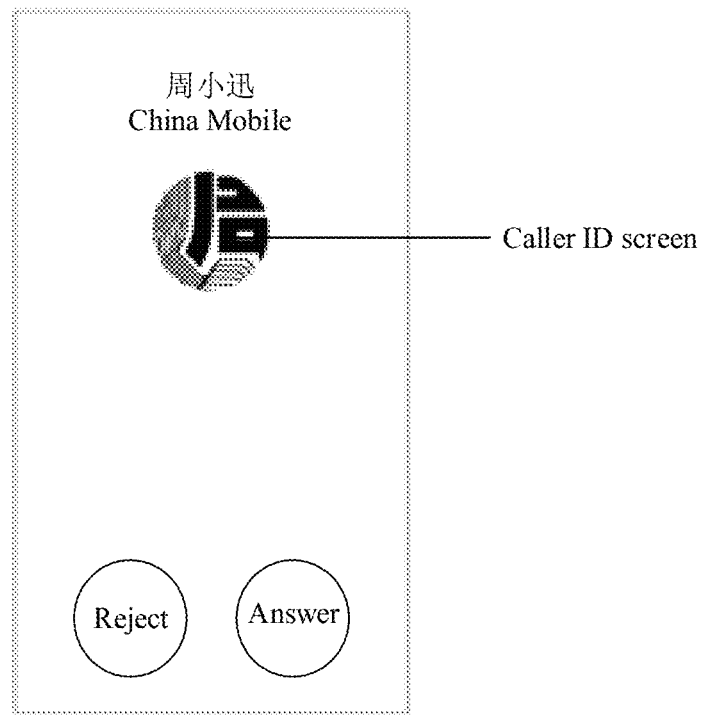
FIG. 10 is a schematic diagram of using a contact avatar as a caller ID screen.

For example, as shown in FIG. 10, an avatar of a contact may be used as a caller ID screen.

Optionally, when the identification pattern of the software program is the contact avatar in the address book, a density of contour lines in the identification pattern may be positively correlated with (specifically, may be directly proportional to) a contact frequency or a degree of intimacy of the contact.

Specifically, when the contact frequency of the contact in the address book is higher, a density of generated contour lines in the contact avatar of the contact is higher. When the degree of intimacy of the contact in the address book is greater, a density of generated contour lines in the contact avatar of the contact is higher.

In this application, the density of the contour lines in the identification pattern may be used to identify contacts with different contact frequencies or different degrees of intimacy. The display effect is better.

Optionally, when the identification pattern of the software program is the contact avatar in the address book, a shade of color of the identification pattern is positively correlated with a contact frequency and/or a degree of intimacy of the contact.

Specifically, when the contact frequency of the contact in the address book is higher, a color of the generated avatar of the contact is darker; when a density of generated contour lines in the contact avatar of the contact is higher, the color of the generated avatar of the contact is also darker.

In this application, the shade of color of the identification pattern may be used to identify contacts with different contact frequencies or different degrees of intimacy. The display effect is better.

In this application, when the identification pattern is the contact avatar in the address book, contacts who use the same character image as contact avatars can be distinguished based on the density of the contour lines in the contact avatar or the shade of color of the contact avatar.

Figure 11:
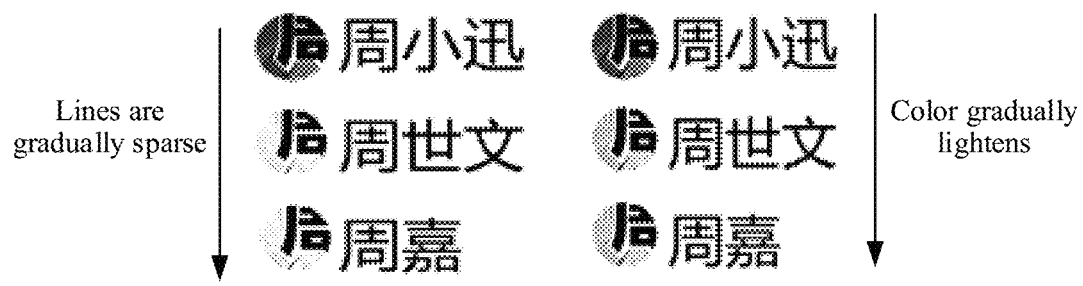
FIG. 11 is a schematic diagram of contact avatars with different densities of contour lines and different shades of color.

For example, as shown in FIG. 11, a plurality of contacts surnamed Zhou exist in the address book. When these contacts are displayed, these contacts may be displayed in descending order of the density of contour lines in the contact avatars, or these contacts may be displayed in descending order of the shade of color of the contact avatars.

Optionally, to enhance the display effect when the identification pattern is displayed, a part of the image in the identification pattern may alternatively be hidden.

Specifically, some of the lines in the identification pattern may be hidden, or a part of the image in the identification pattern may be hidden based on a specific geometric shape.

Figure 12:
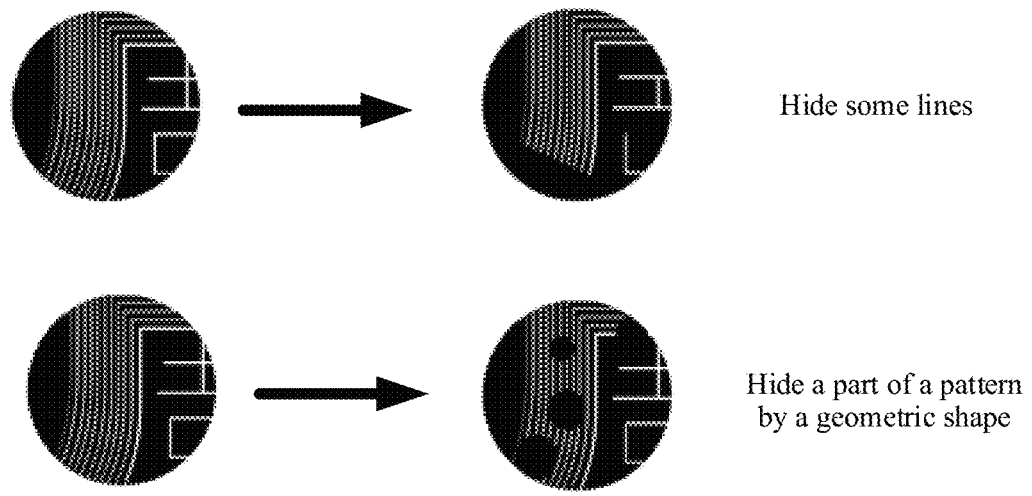
FIG. 12 is a schematic diagram of hiding a part of an image in an identification pattern.

For example, as shown in FIG. 12, some of the lines in the lower part of the identification pattern may be hidden, or images in some circular regions in the identification pattern may be hidden.

Optionally, when the identification pattern is a contact avatar in the address book, the density of the contour lines in the identification pattern may also be dynamically changed depending on call duration.

Specifically, the density of the contour lines in the identification pattern may be directly proportional to the call duration. When a call is just connected, the contour lines in the identification pattern are relatively sparse. As the call duration increases, the contour lines in the identification pattern become denser.

Figure 13:
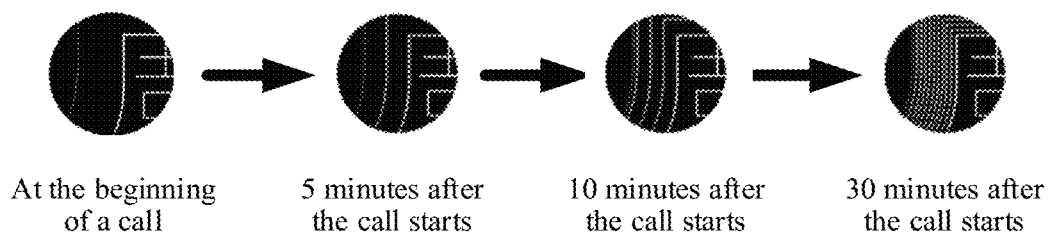
FIG. 13 is a schematic diagram of a density of contour lines of a contact avatar that changes with call duration.

For example, as shown in FIG. 13, at the beginning of the call, a quantity of contour lines in the contact avatar is only two, and the contour lines are sparse. After the call duration reaches 5 minutes, the quantity of contour lines in the contact avatar increases to 3, and a density of the contour lines has increased. When the call duration reaches 10 minutes, the quantity of contour lines in the contact avatar becomes 4, and the density of the contour lines further increases. When the call duration reaches 30 minutes, the quantity of contour lines in the contact avatar has increased a lot, and the contour lines become dense.

It should be understood that the software program in the method shown in FIG. 1 may be any software program in the terminal device, and the identification pattern of the software program may be an identification pattern of an icon of the software program, or the identification pattern of the software program may be an identification pattern of displayed content in the software program.

In addition to performing transformation on the first image based on the contour line of the first image, the second image may be obtained by superimposing a dot-matrix image or a line image on the first image. The following describes this transformation manner in detail with reference to FIG. 14.

Figure 14:
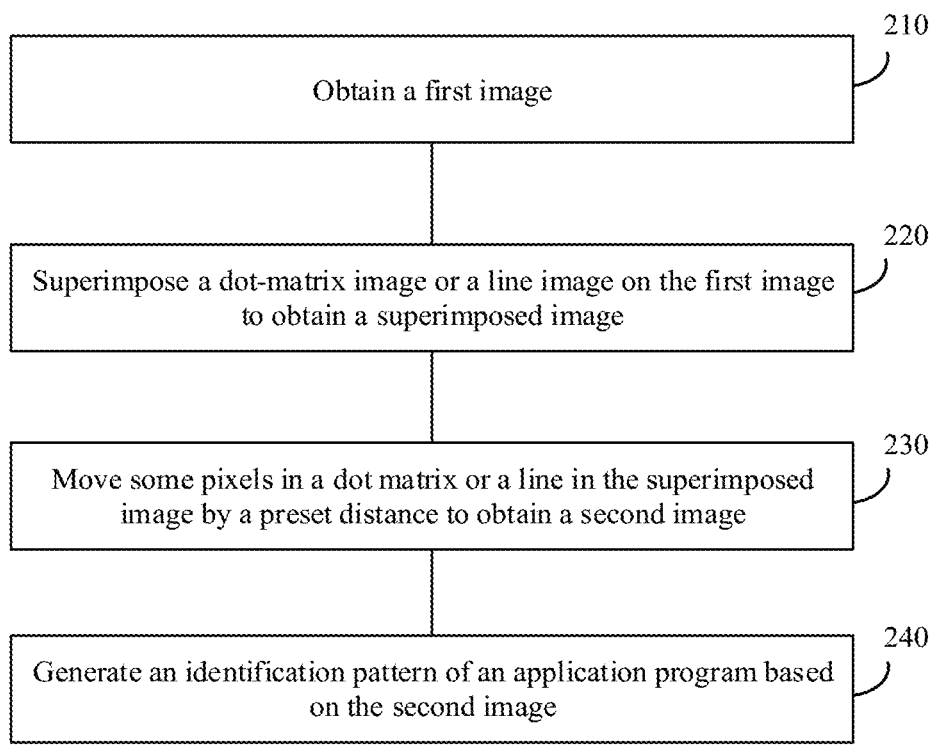
FIG. 14 is a schematic flowchart of a method for generating an identification pattern according to an embodiment of this application.

FIG. 14 is a schematic flowchart of a method for generating an identification pattern according to an embodiment of this application. The method shown in FIG. 14 may be performed by a terminal device. The method shown in FIG. 14 includes steps 210 to 240. The following describes the steps 210 to 240 in detail. [0194] 210: Obtain a first image.

The first image in the foregoing step 210 may be used to represent any one of a Chinese character, an English character, and an Arabic numeral character, and the first image is a hollow character image.

In step 210, the first image may be obtained based on a software program. Specifically, the first image may be obtained based on display information of the software program.

For example, when the software program currently displays a character "周", an image representing the character "周" may be obtained as the first image. The first image may be pre-stored, or may be obtained from a network in real time.

A specific process performed in step 210 is similar to the specific process performed in step 110. The relevant definitions and explanations in step 110 above are also applicable to step 210. To avoid unnecessary repetition, step 210 is not described in detail herein.

220. Superimpose a dot-matrix image or a line image on the first image to obtain a superimposed image.

The dot-matrix image may be an image with relatively sparsely distributed pixels, and the line image may be an image formed by a plurality of lines.

230: Move some pixels in a dot matrix or a line in the superimposed image by a preset distance to obtain a second image.

Optionally, the moving some pixels in a dot matrix or a line in the superimposed image by a preset distance includes: moving the pixels in the superimposed image that are located in an outer contour line of the first image by the preset distance.

Specifically, during moving of some pixels in the superimposed image, an image located in the outer contour line of the first image may be first moved a distance in a direction (which may be, for example, a horizontal direction), and then moved a distance in another direction (which may be, for example, a vertical direction).

Figure 15:
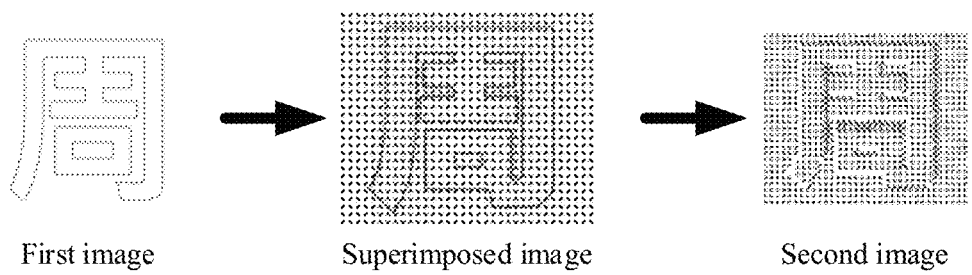
FIG. 15 is a schematic diagram of obtaining a second image by superimposing a first image and a dot-matrix image.

For example, as shown in FIG. 15, assuming that a pixel pitch in the dot-matrix image is d (for example, d may be 6), the image obtained after the dot-matrix image is superimposed on the first image may be shown in the middle of FIG. 15. Then the pixels located in the outer contour line of the first image may be moved to the right side of the image (for example, may be moved by d/2 pixels) and then moved upwards (for example, may be moved by d/2 pixels), and the final second image obtained is shown on the rightmost of FIG. 15.

Figure 16:
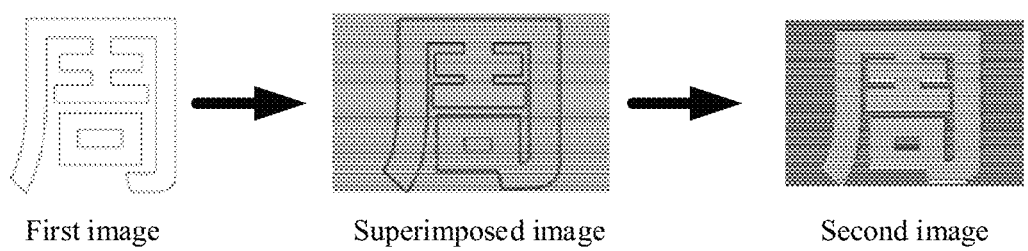
FIG. 16 is a schematic diagram of obtaining a second image by superimposing a first image and a line image.

For example, as shown in FIG. 16, assuming that a line spacing in the line image is d (for example, d may be 2), the image obtained after the line image is superimposed on the first image may be shown in the middle of FIG. 16. Then the pixels located in the outer contour line of the first image may be moved to an upper side of the image (for example, may be moved by d/2 pixels), and the final second image obtained is shown on the rightmost of FIG. 16.

In this application, the dot-matrix image or the line image is superimposed on the first image, and some pixels in the outer contour line are moved, so that the second image with a three-dimensional effect can be obtained, and the identification pattern obtained from the second image also has a three-dimensional effect. This can improve a final display effect.

240: Generate the identification pattern of the software program based on the second image.

In step 240, the second image may be used as the identification pattern of the software program, or an image in a central region of the second image may be selected as the identification pattern of the software program.

It should be understood that the execution process of step 240 is similar to that of the foregoing step 130. The relevant definitions and explanations in step 130 above are also applicable to step 240. To avoid unnecessary repetition, step 240 is not described in detail herein.

In this application, the dot-matrix image or the line image is superimposed on the first image, so that the second image with more diverse display styles can be obtained, and further the identification pattern of the software program with more diverse display styles can be obtained based on the second image. This can improve a display effect of the identification pattern and user experience to some extent.

Optionally, in an embodiment, the identification pattern is an image of a hot spot of the second image.

The image of the hot spot of the second image is a sub-image in the second image from which a character represented by the second image can be recognized. A region in which the image is captured from the second image may also be referred to as a visual hot spot.

Figure 17:
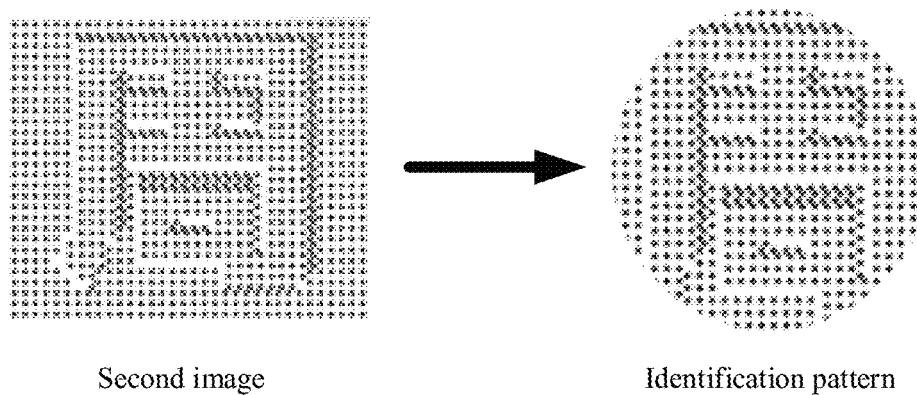
FIG. 17 is a schematic diagram of obtaining an identification pattern based on a second image.

For example, as shown in FIG. 17, because the second image has a relatively large image area, it is not concise enough (or may be unaesthetic) if the second image is directly used as the identification pattern of the software program. To improve a display effect, an image of the hot spot in the second image may be used as the identification pattern, and it can be recognized from the image in the identification pattern that the second image represents the Chinese character "周".

Optionally, in an embodiment, the software program in the method shown in FIG. 14 is an address book, and the identification pattern of the software program is a contact avatar in the address book.

Optionally, when the identification pattern of the software program is the contact avatar in the address book, a density of dot matrices or lines in the identification pattern is positively correlated with a contact frequency and/or a degree of intimacy of the contact represented by the identification pattern.

Specifically, when the contact frequency of the contact in the address book is higher, a density of generated dot matrices or contour lines in the avatar of the contact is higher. When the degree of intimacy of the contact in the address book is greater, a density of generated dot matrices or contour lines in the avatar of the contact is higher.

In this application, the density of the dot matrices or lines in the identification pattern may be used to identify contacts with different contact frequencies or different degrees of intimacy. The display effect is better.

Optionally, when the identification pattern of the software program is the contact avatar in the address book, a shade of color of the identification pattern is positively correlated with a contact frequency and/or a degree of intimacy of the contact.

Specifically, when the contact frequency of the contact in the address book is higher, a color of the generated avatar of the contact is darker; when a density of generated contour lines in the contact avatar of the contact is higher, the color of the generated avatar of the contact is also darker.

In this application, the shade of color of the identification pattern may be used to identify contacts with different contact frequencies or different degrees of intimacy. The display effect is better.

In this application, when the identification pattern is the contact avatar in the address book, the contacts who use the same character image as the contact avatars can be distinguished based on the density of the dot matrices or lines in the contact avatars or the shade of color of the contact avatars.

In this application, in addition to performing some transformation processing on the first image to obtain the second image, to obtain an ampler display effect, a reference picture that matches the first image may be alternatively selected from a picture library, and the identification pattern of the software program is generated based on a reference image similar to the first image in the reference picture. The following describes this transformation manner in detail with reference to FIG. 18.

Figure 18:
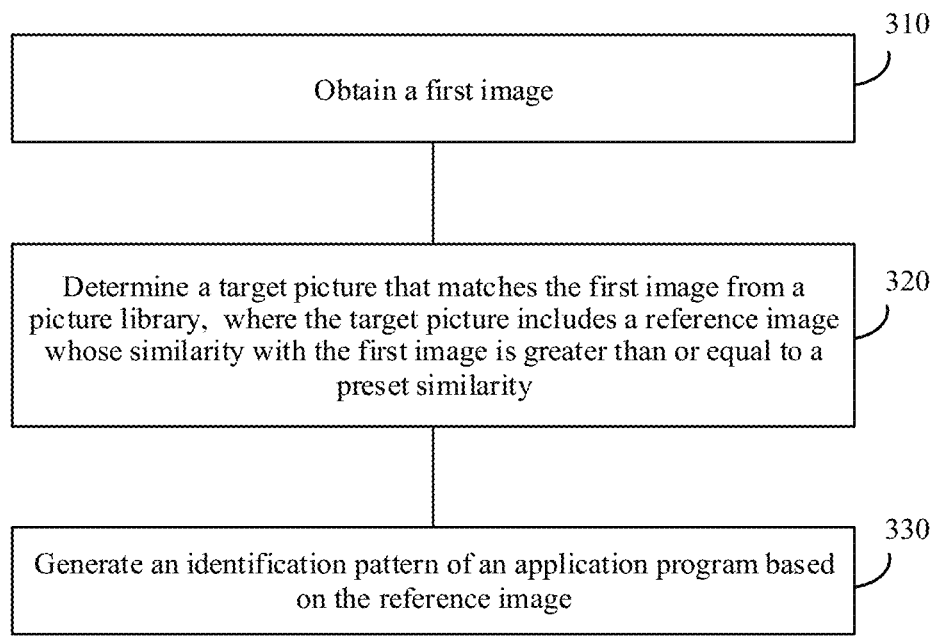
FIG. 18 is a schematic flowchart of a method for generating an identification pattern according to an embodiment of this application.

FIG. 18 is a schematic flowchart of a method for generating an identification pattern according to an embodiment of this application. The method shown in FIG. 18 may be performed by a terminal device. The method shown in FIG. 18 includes steps 310 to 330. The following describes the steps 310 to 330 in detail.

310: Obtain a first image.

The first image in step 310 may be an image for representing an English character or an Arabic numeral character.

In step 310, the first image may be obtained based on a software program. Specifically, the first image may be obtained based on display information of the software program.

For example, when the software program currently displays a character "28", an image representing the character "28" may be obtained as the first image. The first image may be pre-stored, or may be obtained from a network in real time.

A specific process performed in step 310 is similar to the specific process performed in step 110. The relevant definitions and explanations in step 110 above are also applicable to step 310. To avoid unnecessary repetition, repetitive descriptions are appropriately omitted herein.

320: Determine a target picture that matches the first image from a picture library.

The target picture in step 320 includes a reference image whose similarity with the first image is greater than or equal to a preset similarity.

The picture library includes a plurality of pictures, and the plurality of pictures may include images similar to some common English characters or Arabic numeral character patterns.

For example, the picture library may include pictures composed of images similar to English characters A to Z (the images in these pictures are similar to the English characters A to Z), and the picture library may also include pictures composed of images similar to Arabic numerals 0 to 9 (the images in these pictures are similar to Arabic numerals 0 to 9).

In step 320, the target picture that matches the first image may be obtained through a neural network model.

330: Generate an identification pattern of the software program based on the reference image.

A specific execution process of step 330 is similar to that of step 130. A difference only lies in that step 130 is to generate the identification pattern based on the second image, and step 330 is to generate the identification pattern based on the reference image. The relevant definitions and explanations in step 130 above are also applicable to step 330. To avoid unnecessary repetition, repetitive descriptions are appropriately omitted herein.

In this application, the picture that matches the first picture is selected from the picture library. Because the picture includes richer patterns, an identification pattern with richer styles can be obtained based on the reference image in the target picture, and a display effect of the identification pattern can be improved.

Optionally, before step 330, the method shown in FIG. 18 further includes: capturing or extracting a reference image from the target picture.

Optionally, in an embodiment, the identification pattern is an image of a hot spot of the reference image, where the image of the hot spot of the reference image is a sub-image in the reference image from which a character represented by the reference image can be recognized.

Figure 19:
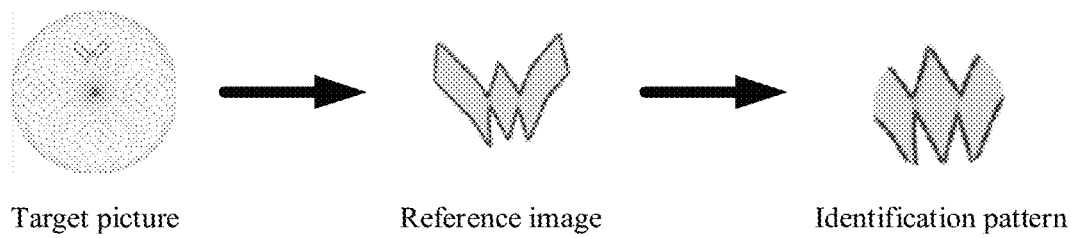
FIG. 19 is a schematic diagram of obtaining an identification pattern based on a target picture.

For example, as shown in FIG. 19, assuming that the first image is a character image of the letter "W", the target picture can be retrieved from the picture library, and the reference image in the target picture is similar to the letter "W". Then the reference image can be extracted from the target picture, and then the hot zone image of the reference image can be captured as the identification pattern of the software program.

Optionally, in an embodiment, texture distribution of pictures in the picture library meets the characteristics of the Golden Mean or the Fibonacci sequence.

In this application, because the texture distribution of the pictures in the picture library meets the characteristics of the Golden Mean or the Fibonacci sequence, the identification pattern of the software program finally obtained from the pictures in the picture library is aesthetic and can provide better user experience.

In addition, in this application, to further improve the display effect, an image of a current weather condition may also be superimposed on the identification pattern based on weather information.

Figure 20:
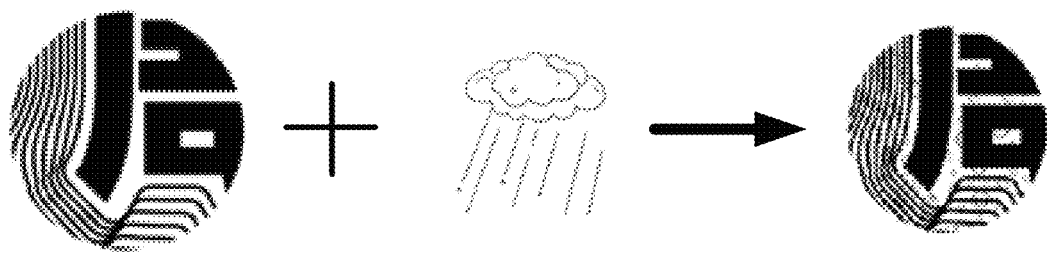
FIG. 20 is a schematic diagram of superimposing a weather image on an identification pattern.

For example, as shown in FIG. 20, an image representing rain may be superimposed on the identification pattern, thereby adding a raindrop effect to the finally obtained identification pattern.

The identification pattern in this embodiment of this application may be used as a contact avatar. The following describes in detail a specific process of generating a contact avatar with reference to FIG. 21 to FIG. 26.

Figure 21:
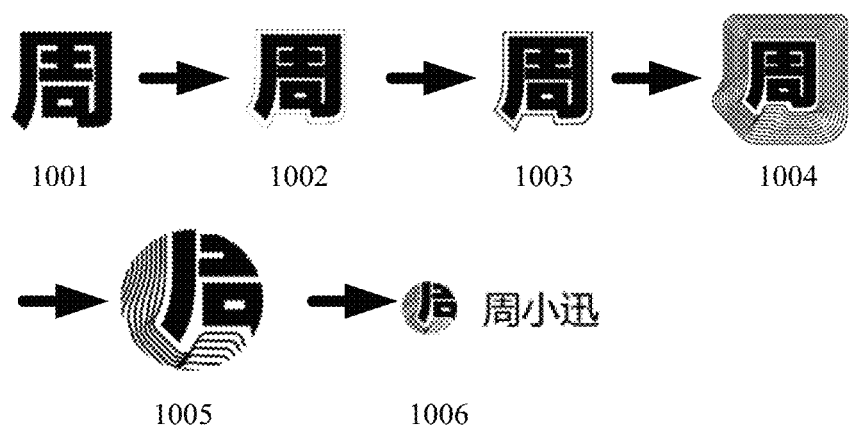
FIG. 21 is a schematic diagram of a process of generating a contact avatar according to an embodiment of this application.
Figure 22:
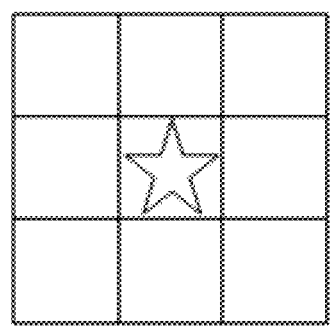
FIG. 22 is a schematic diagram of a 5×5 convolution kernel.

FIG. 21 is a schematic diagram of a process of generating a contact avatar according to an embodiment of this application. The process shown in FIG. 21 includes steps 410 to 460, which are described in detail below.

410: Obtain a character image 1001.

The character image 1001 may be a pre-stored character image. When an avatar of a contact surnamed "周" needs to be generated, the character image 1001 may be retrieved from the pre-stored character image.

Optionally, the character image 1001 may be a hollow character image in addition to a solid character image.

Specifically, in step 410, when a contact named "周 XX" is obtained from an address book, a character image of a character "周" (the surname or the first letter of the surname may be selected, or a character in the given name may be selected) may be obtained.

In normal circumstances, a terminal device generally stores character images of hundred family surnames, 26 letters or Arabic numerals 0 to 9. When the character image is obtained in step 410, a corresponding image may be obtained from the pictures stored in the terminal device based on name information of the contact.

420: Perform expansion processing on the character image 1001 to obtain an expanded image 1002.

In step 420, the image 1002 with a white expansion region around the image may be obtained by performing expansion processing on the character image 1001.

Specifically, in step 420, morphological expansion may be performed on the character image 1001 to obtain the expanded image 1002. The following briefly describes the principle of image expansion.

In an expansion process, a convolution kernel B (the kernel may also be referred to a template or a mask) may be first defined. The convolution kernel may be of any shape and size, and has a separately defined reference point, an anchor point (anchor point). Usually, the convolution kernel is in a square or disc with a reference point. In this embodiment of this application, the convolution kernel B may be a convolution kernel with a size of 3*3 (or may be a convolution kernel with a size of 5*5) shown in FIG. 22.

After the convolution kernel B is obtained, the convolution kernel B may be convolved with an image A (original image), and a pixel preset value of a region covered by the kernel B may be calculated, to obtain a convolutionally processed image.

Convolution is an operation in analytical mathematics. A convolution operation performed on a digital image is actually a process of using the convolution kernel (convolution template) to slide on the image, multiplying a pixel gray value of a point on an image by a value of a corresponding convolution kernel, and adding up all multiplied values and using an obtained value as a gray value of a pixel on the image corresponding to a middle pixel of the convolution kernel, and finally completing sliding on all images.

In the foregoing step 420, a transformation kernel B may be used to perform convolution processing on the character image 1001, and the image 1002 whose black region is expanded by 1 pixel is finally obtained. A gray line frame in the image 1002 does not actually exist, but is only for showing a range of an expanded white region.

430: Extract an outer contour image of the image 1002.

In step 430, an edge of a character may be detected by using a character edge detection method, and the outer contour image 1003 including a black contour line is finally obtained.

The outer contour image may also be understood as a character image containing an outer contour line. [0261] 440: Equidistantly extend the outer contour image 1003 to obtain an extended character image 1004.

In step 440, equidistantly extending the outer contour image 1003 may also be understood as equidistantly extending the outer contour line of the image 1003. A distance between extended outer contour lines may be 5 pixels. A quantity of outer contour lines that extend outwards may be 10.

In addition, the extended character image 1004 is equivalent to the foregoing second image. After the extended character image 1004 is obtained, the contact avatar may be generated based on the extended character image 1004.

In step 440, the quantity of extended outer contour lines may be determined based on a degree of intimacy or a contact frequency of the contact. For example, when the degree of intimacy of the contact is higher or the contact frequency of the contact is higher, there are more extended outer contour lines. On the contrary, when the degree of intimacy of the contact is lower or the contact frequency of the contact is lower, there are fewer extended outer contour lines.

The quantity of extended outer contour lines can reflect the degree of intimacy or the contact frequency of the contact, so that the finally obtained contact avatar has a better display effect.

450: Capture an image of a hot spot of the extended character image 1004, and use the image of the hot spot as the contact avatar.

In step 450, the finally obtained contact avatar is shown as 1006 in FIG. 21.

Figure 23:
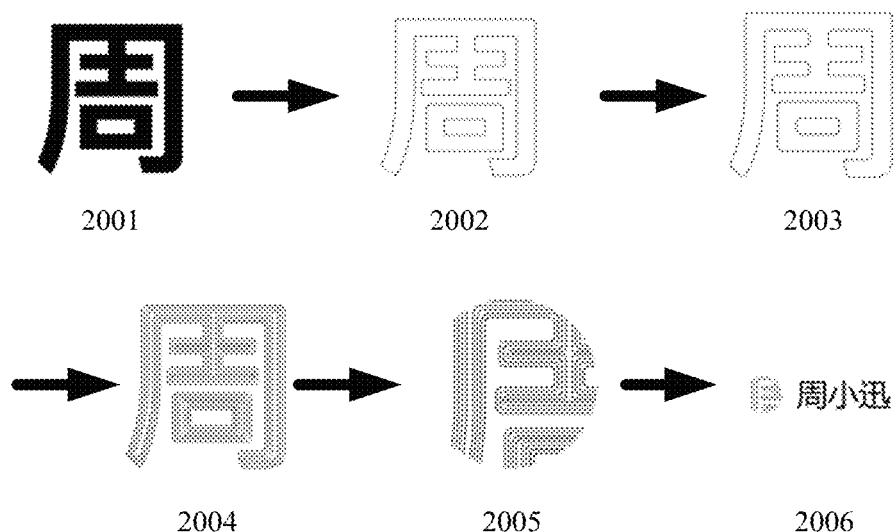
FIG. 23 is a schematic diagram of a process of generating a contact avatar according to an embodiment of this application.

FIG. 23 is a schematic diagram of a process of generating a contact avatar according to an embodiment of this application. The process shown in FIG. 23 includes steps 510 to 550, which are described in detail below.

510: Perform processing on a character image 2001 to obtain a hollow character image 2002.

The character image 2001 may be a pre-stored character image. When an avatar of a contact surnamed "周" needs to be generated, the character image 2001 may be retrieved from the pre-stored character image.

Alternatively, when the avatar of the contact surnamed "周" needs to be generated, a hollow character image of the character "周" may be directly obtained, so that the hollow character image 2002 is directly obtained.

The character image 2001 is a solid character image. To realize indentation processing on an inner contour line, the character image 2001 needs to be transformed from the solid character image to the hollow character image.

If the character image 2001 is a hollow character image, the processing in step 510 may not be performed on the character image 2001, but step 520 is directly performed.

520: Perform fillet processing on the character image 2002 to obtain a character image 2003 with a rounded contour.

A contour of the character image 2002 is a right-angled contour. To further improve the display effect, the contour of the character image 2002 may be transformed from the right-angled contour to the rounded contour to obtain the character image 2003.

530: Equidistantly indent the inner contour line of the character image to obtain an indented character image 2004.

The inner contour line is equidistantly indented, so that the obtained character image 2004 includes neatly arranged contour lines. This can improve a final display effect.

In step 530, a quantity of indented inner contour lines may be determined based on a degree of intimacy or a contact frequency of the contact. For example, when the degree of intimacy of the contact is higher or the contact frequency of the contact is higher, there are more indented inner contour lines. On the contrary, when the degree of intimacy of the contact is lower or the contact frequency of the contact is lower, there are less indented inner contour lines.

The quantity of indented inner contour lines can reflect the degree of intimacy or the contact frequency of the contact, so that the finally obtained contact avatar has a better display effect.

540: Capture an image of a hot spot of the character image 2004 to obtain a character image 2005.

The manner of capturing the image of the hot spot in step 540 is similar to the foregoing manner of capturing the image, and is not described in detail herein.

550: Use the captured character image 2005 as a contact avatar.

A display effect of the finally obtained contact avatar is shown as 2006 in the figure.

Figure 24:
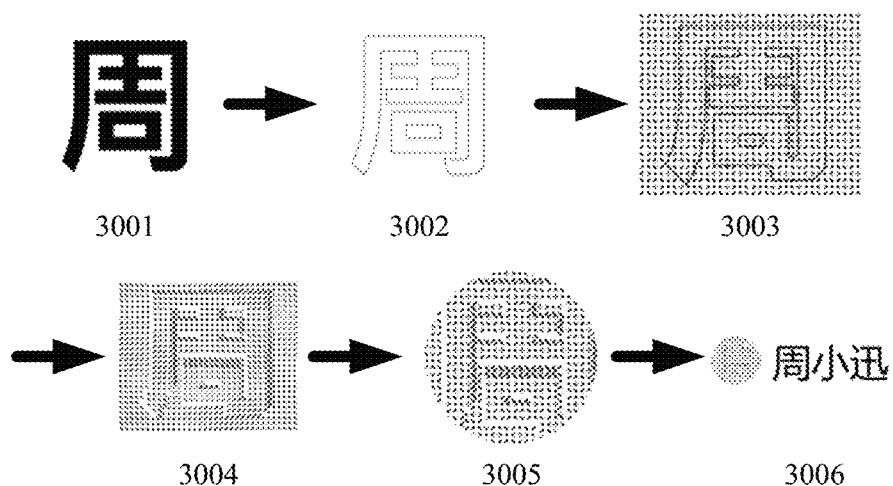
FIG. 24 is a schematic diagram of a process of generating a contact avatar according to an embodiment of this application.

FIG. 24 is a schematic diagram of a process of generating a contact avatar according to an embodiment of this application. The process shown in FIG. 24 includes steps 610 to 650, which are described in detail below.

610: Perform processing on a character image 3001 to obtain a hollow character image 3002.

The character image 3001 may be a pre-stored character image. When an avatar of a contact surnamed "周" needs to be generated, the character image 3001 may be retrieved from the pre-stored character image.

Alternatively, when the avatar of the contact surnamed "周" needs to be generated, a hollow character image of the character "周" may be directly obtained, so that the hollow character image 3002 is directly obtained.

620: Superimpose a dot-matrix image on the character image 3002 to obtain a superimposed image 3003.

The superimposed image 3003 includes the character image 3002 and dot matrices.

The dot-matrix image may be an image with an image area greater than or equal to that of the character image 3001, and the dot-matrix image can completely cover the character image 3001 when being superimposed on the character image 3001.

In addition, when a contact frequency or a degree of intimacy of the contact surnamed "周" is higher, a dot-matrix image with relatively dense dot matrices may be selected to superimpose on the character image 3001; or when a contact frequency or a degree of intimacy of the contact surnamed "周" is lower, a dot-matrix image with relatively sparse dot matrices may be selected to superimpose on the character image 3001. In this way, a density of the dot matrices in the finally obtained contact avatar can reflect the contact frequency or the degree of intimacy of the contact, and can better distinguish different contacts.

630: Move pixels of the dot matrix in the character image 3002 in the superimposed image by a preset distance to obtain a pixel-shifted character image 3004.

In step 630, through pixel shifting, a pixel-shifted image region can present a three-dimensional effect, which can improve a display effect of the image (as shown in FIG. 24, a character in the image 3003 presents a three-dimensional effect).

640: Capture an image of a hot spot of the character image 3004 to obtain a character image 3005.

The manner of capturing the image of the hot spot in step 640 is similar to the foregoing manner of capturing the image, and is not described in detail herein.

650: Use the captured character image 3005 as a contact avatar.

In step 650, a display effect of the finally obtained contact avatar is shown as 3006 in the figure.

Figure 25:
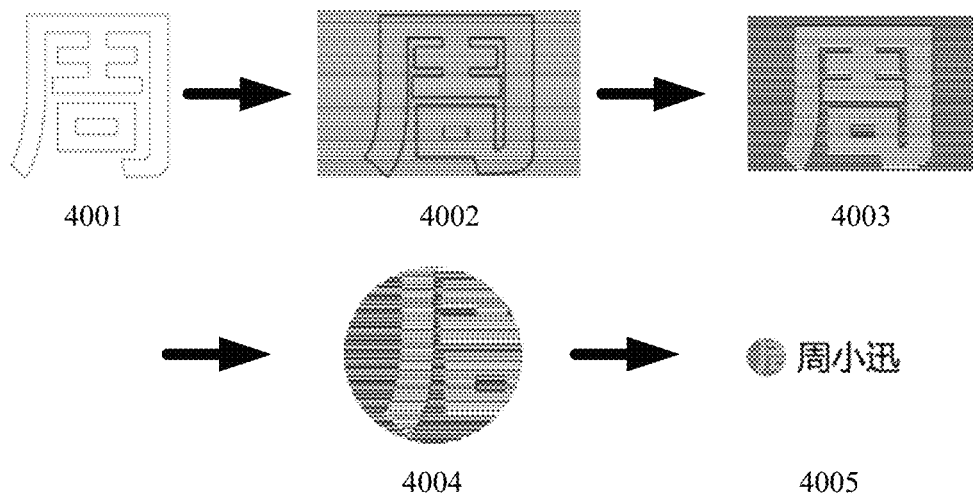
FIG. 25 is a schematic diagram of a process of generating a contact avatar according to an embodiment of this application.
Figure 26:
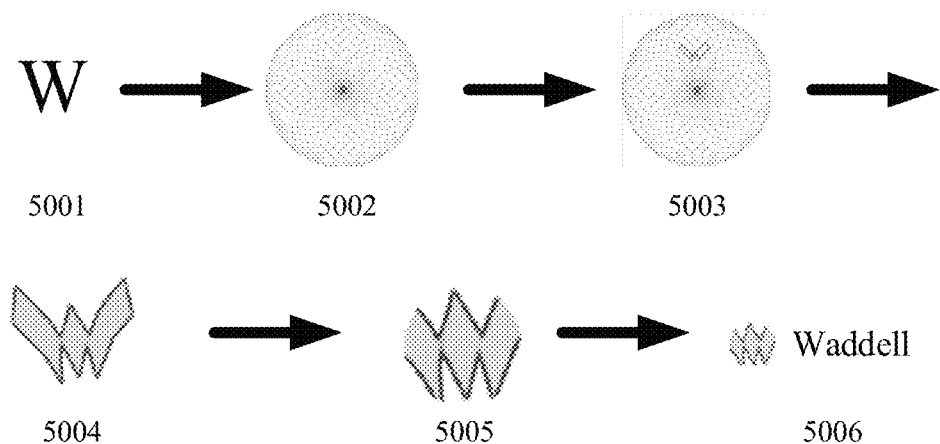
FIG. 26 is a schematic diagram of a process of generating a contact avatar according to an embodiment of this application.

FIG. 25 is a flowchart of a method for generating an identification pattern according to an embodiment of this application. The method shown in FIG. 25 describes a complete process of generating a contact avatar by using a contact surnamed 周 as an example. The method shown in FIG. 25 includes steps 710 to 750. The following describes the steps 710 to 750 in detail.

710: Obtain a character image 4001 based on contact information.

The character image 4001 may be a pre-stored character image. When an avatar of a contact surnamed "周" needs to be generated, the character image 4001 may be retrieved from the pre-stored character image.

Alternatively, when the avatar of the contact surnamed "周" needs to be generated, a solid character image of the character "周" may be first obtained, and then the solid character image is transformed into a hollow character image, so that the character image 4001 is obtained.

720: Superimpose a line image on the character image 4001 to obtain a superimposed image 4002.

The line image may be an image with an image area greater than or equal to that of the character image 4001, and the line image can completely cover the character image 4001 when being superimposed on the character image 4001.

In addition, when a contact frequency or a degree of intimacy of the contact surnamed "周" is higher, a line image with relatively dense lines may be selected to superimpose on the character image 4001; or when a contact frequency or a degree of intimacy of the contact surnamed "周" is lower, a line image with relatively sparse lines may be selected to superimpose on the character image 4001. In this way, a density of the lines in the finally obtained contact avatar can reflect the contact frequency or the degree of intimacy of the contact, and can better distinguish different contacts.

Optionally, in step 720, a dot-matrix image may be alternatively superimposed on the character image 4001.

730: Move pixels of the line in the character image 4002 in a superimposed image by a preset distance to obtain a pixel-shifted character image 4003.

In step 730, through pixel shifting, a pixel-shifted image region can present a three-dimensional effect, which can improve a display effect of the image (as shown in FIG. 25, a character in the image 4003 presents a three-dimensional effect).

740: Capture an image of a hot spot in the image 4003 to obtain an image 4004.

The manner of capturing the image of the hot spot in step 740 is similar to the foregoing manner of capturing the image, and is not described in detail herein.

750: Use the captured image 4004 as a contact avatar.

After step 750, the finally obtained contact avatar is shown as 4005 in FIG. 25.

FIG. 25 is a flowchart of a method for generating an identification pattern according to an embodiment of this application. The process of generating an identification pattern shown in FIG. 25 includes steps 810 to 850, which are described in detail below.

810: Obtain a character image 5001 of "W".

For example, for a contact named "Waddel", the first character W of the contact name may be extracted, so that the character image 5001 of "W" can be obtained first.

The character image 5001 may be a pre-stored character image. When an avatar of a contact with the first character "W" needs to be generated, the character image 5001 may be retrieved from the pre-stored character image. [0316] 820: Determine a picture 5002 that matches the character image 5001 from a picture library.

It should be understood that the picture 5002 may include a target image with a high similarity to the image 5001 (a similarity between the target image and the image 5001 is greater than a preset threshold).

830. Identify a letter region in the picture 5002.

The letter region in the picture 5002 is a region in which the target image in the picture 5002 is located, and the letter region in the picture 5002 is an image region similar to the letter W.

To ensure that a picture that matches the corresponding character image can be found in the picture library, some training pictures may be used to train a neural network model in advance. These training pictures include images similar to some commonly used English characters or numeric characters. For example, the training pictures may include images similar to 26 English characters (A to Z) or 10 numeric characters (0 to 9).

Specifically, before training starts, letter regions of the training pictures and letters corresponding to the training pictures may be manually marked (for example, for a picture, if the picture includes an image region similar to the letter A, the image region similar to the letter A may be manually marked in the picture, and a letter corresponding to the picture is marked as A) to form a training set, and then the training set is used to train the neural network model.

In addition, the pictures in the training set may be texture images with the characteristics of the Golden Mean or Fibonacci sequence, which makes the finally obtained identification pattern more aesthetic.

The following uses a training process of the letter A as an example for detailed description.

A target picture (the target picture includes an image similar to the letter A) is retrieved, an image region similar to the letter A in the target picture is marked, then the picture is input to a neural network model, and each pixel is classified (for example, a region in which the letter "A" is located is classified as one class, and a region other than the region in which the letter "A" is located as another class) to form a mask image with the same size as the target image (for example, the region "A" is a black image, and the non-"A" region is a white image), which is output as a training result of the neural network model.

Similarly, the foregoing operations are repeated on other pictures (the pictures include an image similar to the letter A) for a preset quantity of times (such as 1000 times), to complete the training of the letter "A" for the preset times. In this case, the computer has an ability to recognize the letter "A" region in the preset picture through the foregoing training.

The neural network model may be a convolutional neural network (convolutional neural network, CNN), a fully convolutional neural network (fully convolutional networks, FCN), or the like.

840. Capture an image of the letter region to obtain an image 5004.

The image 5004 is similar to the character image 5001 of "W", and a display style of the image 5004 is more unique. Therefore, generating the final contact avatar based on the image 5004 can make the display effect of the finally generated contact avatar better.

850: Capture an image of a hot spot in the image 5004 to obtain an image 5005.

The manner of capturing the image of the hot spot in step 850 is similar to the foregoing manner of capturing the image, and is not described in detail herein.

In addition, to obtain a better display effect, the image 5004 may be processed according to the method for generating an identification pattern in FIG. 1 or FIG. 14 in the embodiments of this application before step 850. For example, transformation is performed on the image 5004 based on a contour line of the image 5004, or a dot-matrix image or a line image is superimposed on the image 5004 to obtain a processed image, and then step 850 is performed, so that a finally obtained identification pattern achieves a better display effect.

860: Use the image 5005 as a contact avatar.

After step 860, the display effect of the finally obtained contact avatar is shown as 5006 in the figure.

The identification pattern in this embodiment of this application may alternatively be a temperature number in a weather application. The following describes in detail the situation in which the identification pattern is a temperature number in a weather application with reference to FIG. 27.

Figure 27:
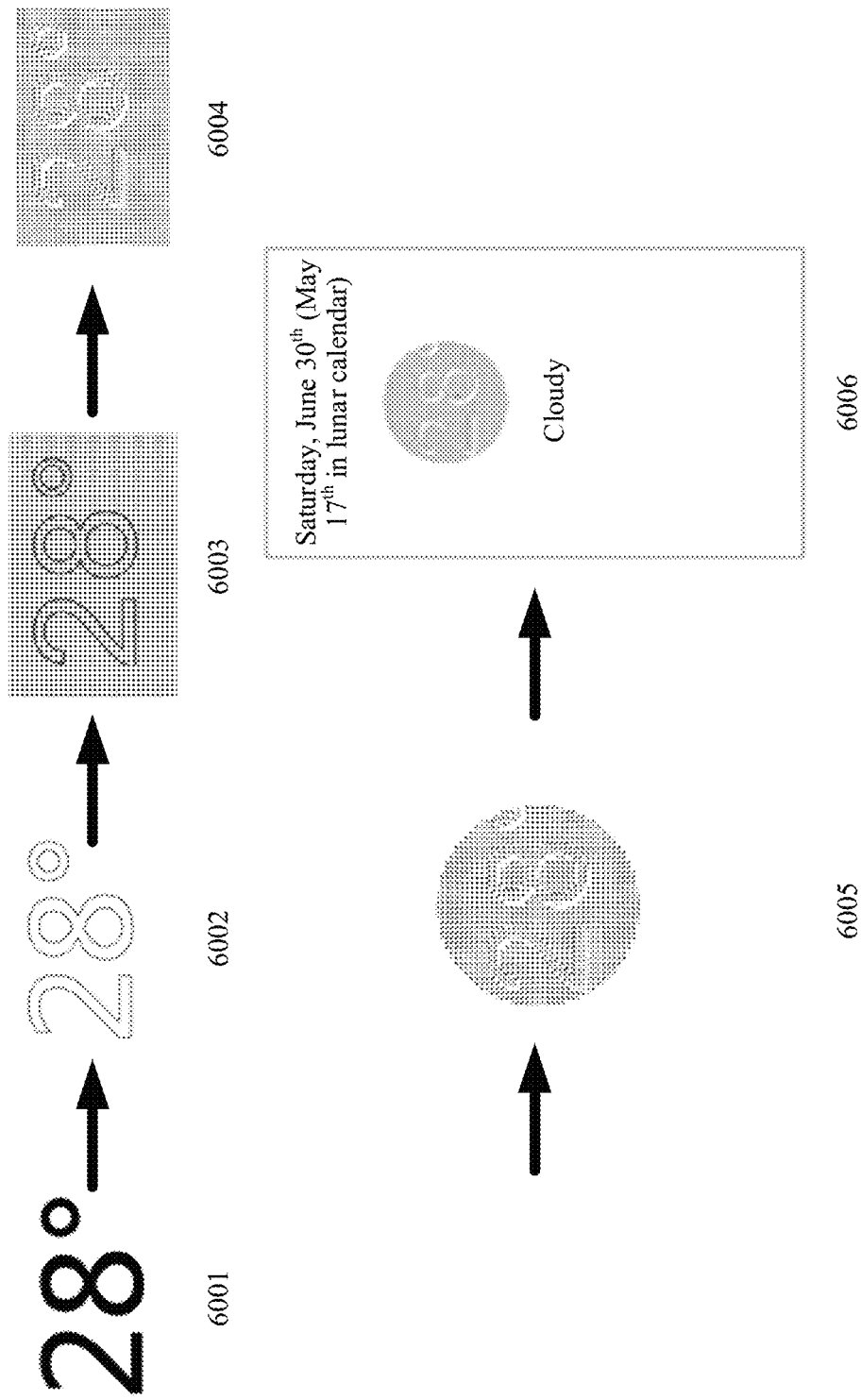
FIG. 27 is a schematic diagram of a process of generating a temperature display icon according to an embodiment of this application.

FIG. 27 is a schematic diagram of a process of generating a temperature display icon according to an embodiment of this application. The process of generating an identification pattern shown in FIG. 27 includes steps 910 to 960, which are described in detail below.

910. Obtain a character image of a current temperature.

In step 910, when the current temperature is 28° C., the obtained 28° C. character image is shown as 6001 in the figure.

The character image 6001 may be a pre-stored character image. When the current temperature is 28° C., the 28° C. character image may be retrieved from the pre-stored digital character image.

920: Perform processing on the character image 6001 to obtain a hollow character image 6002.

It should be understood that if the 28° C. character image obtained in step 910 is a hollow character image, step 920 may be skipped, and step 930 may be performed directly.

930: Superimpose a dot-matrix image on the character image 6002 to obtain a superimposed image 6003.

An image area of the dot-matrix image may be greater than or equal to that of the character image 6001, and the dot-matrix image can completely cover the character image 6002 when being superimposed on the character image 6002.

Optionally, when a temperature represented by the character image 6002 is higher, dot matrices of the dot-matrix image superimposed on the character image 6002 are denser.

Dot matrices of different densities can represent different temperature levels, showing a better display effect.

940: Move pixels of the dot matrices that are in a character region of the character image 6003 by a preset distance to obtain a pixel-shifted character image 6004.

In step 940, shifting the pixels of the dot matrices in the character region can make the shifted image region present a three-dimensional effect, which can improve a display effect of the image (as shown in FIG. 27, the character region in the image 6004 presents a three-dimensional effect).

950: Capture an image of a hot spot in the image 6004 to obtain an image 6005.

The manner of capturing the image of the hot spot in step 950 is similar to the foregoing manner of capturing the image, and is not described in detail herein.

960: Use the captured image 6005 as a temperature display icon.

After step 960, the finally obtained temperature display icon is shown as 6006 in FIG. 27.

It should be understood that, in addition to the contact avatar, the identification pattern in this embodiment of this application may also be a display icon related to a variety of software programs. The software program of this embodiment of this application and the application examples of the identification pattern of the software program may be as follows:

(1) the software program is a photo album, and the identification pattern of the software program is a photo album cover pattern;

(2) the software program is a memo, and the identification pattern of the software program is an identification pattern of memo information in the memo;

(3) the software program is a music application, and the identification pattern of the software program is a cover of a playlist in the music application;

(4) the software program is a voice assistant, and the identification pattern of the software program is a display icon of the voice assistant;

(5) the software program is a recording application, and the identification pattern of the software program is an avatar of a recordee; and (6) the software program is a weather application, and the identification pattern of the software program is a display icon of the weather application.

The following describes these application scenarios in detail with reference to FIG. 28 to FIG. 35.

Optionally, the identification pattern in this embodiment of this application is a lock screen pattern.

Figure 28:
FIG. 28 is a schematic diagram of using an identification pattern as a lock screen pattern according to an embodiment of this application.

For example, if a user sets a paragraph of text "开心每一天" on a lock screen, the method for generating an identification pattern in this embodiment of the application may be used to extract a character image of the character "开" for processing, and a display effect of the generated final identification pattern is shown in FIG. 28.

Optionally, the identification pattern in this embodiment of this application may alternatively be a calendar application.

Figure 29:
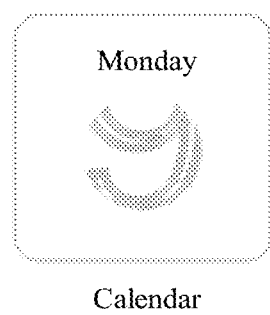
FIG. 29 is a schematic diagram of using an identification pattern as a display icon of a calendar application according to an embodiment of this application.

For example, assuming that today is the 9$^{th}$ day, a digit "9" is displayed on the calendar application. In this case, the method for generating an identification pattern in this embodiment of this application may be used to extract a character image of the digit "9" and process the character image of the digit "9". A display effect of the generated identification pattern is shown in FIG. 29.

Optionally, the identification pattern in this embodiment of this application is an icon of a title of a memo, a document, or a note.

Figure 30:
FIG. 30 is a schematic diagram of using an identification pattern as an icon of a memo title according to an embodiment of this application.

For example, if a user records a piece of memo information in the memo, and a title of the memo information is "开车去接小孩", a character image of the first character "开" is extracted from the title according to the method for generating an identification pattern in this embodiment of the application for processing. A display effect of the generated title icon is shown in FIG. 30.

Optionally, the identification pattern in this embodiment of this application is an icon of an alarm clock or an event title of a reminder event.

Figure 31:
FIG. 31 is a schematic diagram of using an identification pattern as a title of a reminder event according to an embodiment of this application.

For example, if a user sets a reminder event "开车去接小孩" on a mobile phone, a character image of the character "开" in the title of the reminder event may be extracted, and then the character image of the character "开" is processed by using the method for generating an identification pattern in this embodiment of this application. A display effect of an icon of the title of the generated reminder event is shown in FIG. 31.

Optionally, the identification pattern in this embodiment of this application is an icon of a music playlist.

Figure 32:
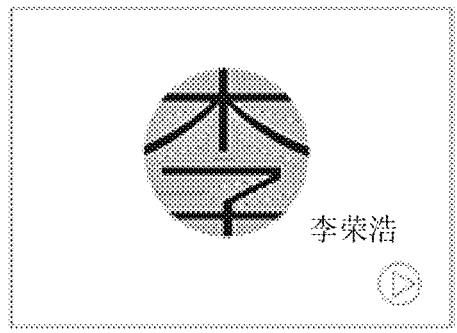
FIG. 32 is a schematic diagram of using an identification pattern as an icon of a music playlist according to an embodiment of this application.

For example, if the music application has a playlist of songs of Li Ronghao, the method for generating en identification pattern in this embodiment of this application may be used to process a character image of "李", and a display effect of the generated playlist icon is shown in FIG. 32.

Optionally, the identification pattern in this embodiment of this application is an icon of a voice assistant.

Figure 33:
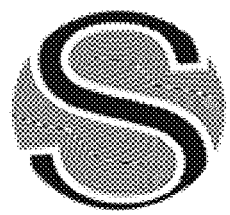
FIG. 33 is a schematic diagram of using an identification pattern as an icon of a voice assistant according to an embodiment of this application.

Specifically, the icon of the voice assistant is a character image of "S", and the character image of "S" is processed by using the method for generating an identification pattern in this embodiment of this application, and the generated voice assistant icon is shown in FIG. 33.

Optionally, the identification pattern in this embodiment of this application is a display icon of a recordee in a multi-person recording scenario.

Figure 34:
FIG. 34 is a schematic diagram of using an identification pattern as a display icon of a recordee in a multi-person recording scenario according to an embodiment of this application.
Figure 35:
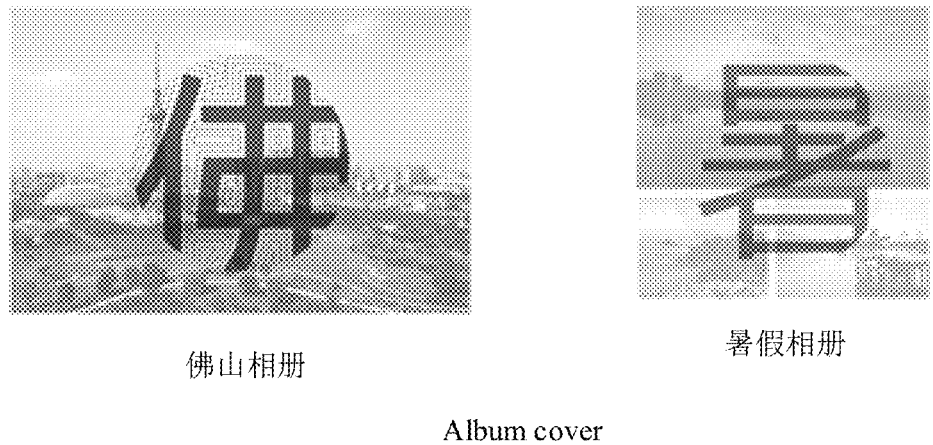
FIG. 35 is a schematic diagram of using an identification pattern as an icon of an album cover according to an embodiment of this application.

Specifically, this embodiment of this application may be applied to a scenario in which a plurality of people are recording. In the scenario in which a mobile phone is used to record several surrounding mobile phones, the mobile phone can determine locations of sound sources and display icons of recordees in the corresponding locations on a recording screen. For example, if the current mobile phone is used for multi-people recording, and the recordees include Li Xiaoming and Zhou Xiaoxun, character images of "李" and "周" may be extracted, the character images of "李" and "周" are processed by using the method for generating an identification pattern in this embodiment of the application, and generated icons are used to identify icons of the two users in corresponding locations of the recording screen. Specific display is shown in FIG. 34.

Optionally, the identification pattern in this embodiment of this application is an icon of an album cover.

Specifically, the method for generating an identification pattern in the embodiments of this application may be used to generate an identification pattern related to album information such as a place name, a festival, or a name, and superimpose the identification pattern on a cover of the album in a gallery to form an icon of the album cover.

For example, if a user visits Foshan on holiday, and an album named "佛山" is generated in a picture application, a character image of the first word "佛" of the album name may be extracted, and the character image of "佛" is processed by using the method for generating an identification pattern in this embodiment of this application. An icon of the generated album cover is shown on the left of FIG. 35. Similarly, for an album named "暑假" in the picture application, a character image of the first word "暑" of the album name may be extracted, and the character image of "暑" is processed by using the method for generating an identification pattern in this embodiment of this application. An icon of the generated album cover is shown on the right of FIG. 35.

The foregoing describes the method for generating n identification pattern in the embodiments of this application in detail with reference to FIG. 1 to FIG. 35. The following describes a terminal device of the embodiments of this application with reference to FIG. 36 to FIG. 40. It should be understood that the terminal device in FIG. 36 to FIG. 40 can perform the method for generating n identification pattern of the embodiments of this application. When the terminal device of the embodiments of this application is described below, the repeated description is appropriately omitted.

Figure 36:
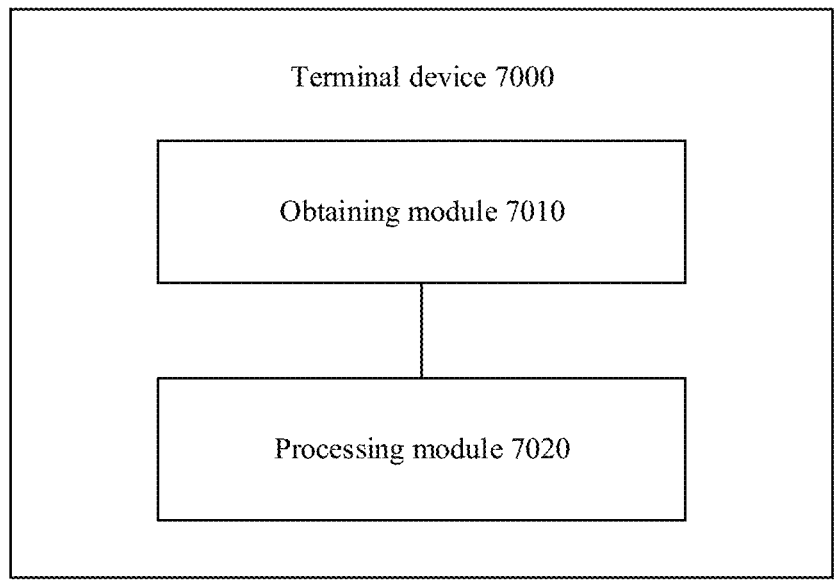
FIG. 36 is a schematic block diagram of a terminal device according to an embodiment of this application.

FIG. 36 is a schematic block diagram of a terminal device according to an embodiment of this application. The terminal device 7000 shown in FIG. 36 includes:

an obtaining module 7010, configured to obtain a first image, where the first image is used to represent any one of a Chinese character, an English character, and an Arabic numeral character; and a processing module 7020, where the processing module 7020 is configured to:

perform transformation on the first image based on a contour line of the first image to obtain a second image, where the second image includes the first image and a plurality of contour lines; and generate an identification pattern of the software program based on the second image.

In this application, transformation is performed on the first image, so that the second image including the plurality of contour lines can be obtained, and further the identification pattern of the software program with more diverse display styles can be obtained based on the second image. This can improve a display effect of the identification pattern and user experience to some extent.

Optionally, in an embodiment, the processing module 7020 is configured to:

extend the outer contour line of the first image towards a periphery of the first image to obtain the second image, where the outer contour line of the first image is a contour line formed around a peripheral edge of the first image.

Optionally, in an embodiment, the first image is a hollow character image, and the processing module 7020 is configured to:

extend an inner contour line of the first image towards an interior of the first image to obtain the second image, where the inner contour line of the first image is a contour line formed by a plurality of edges of the first image.

Optionally, in an embodiment, the first image is a solid character image, and the processing module 7020 is configured to:

perform transformation on the first image to obtain a transformed first image, where the transformed first image is a hollow character image; and extend an inner contour line of the transformed first image towards an interior of the transformed first image to obtain the second image.

Optionally, in an embodiment, the contour line of the first image is a rectangular contour line, and the processing module 7020 is configured to:

process the contour line of the first image to obtain a processed first image, where a contour line of the processed first image is a rounded contour line; and perform transformation on the processed first image based on the rounded contour line to obtain the second image.

Optionally, in an embodiment, the processing module 7020 is configured to:

determine an image of a hot spot of the second image as an identification pattern of the software program, where the image of the hot spot of the second image is a sub-image in the second image from which a character represented by the second image can be recognized.

Optionally, in an embodiment, the software program is an address book, and the identification pattern of the software program is a contact avatar in the address book.

Optionally, in an embodiment, a density of contour lines in the identification pattern is positively correlated with a contact frequency and/or a degree of intimacy of a contact represented by the identification pattern.

Optionally, in an embodiment, a shade of color of the identification pattern is positively correlated with a contact frequency and/or a degree of intimacy of a contact represented by the identification pattern.

Optionally, in an embodiment, the software program is an album, and the identification pattern of the software program is a pattern of an album cover; or the software program is a memo, and the identification pattern of the software program is an identification pattern of memo information in the memo; or the software program is a music application, and the identification pattern of the software program is a cover of a playlist in the music application; or the software program is a voice assistant, and the identification pattern of the software program is a display icon of the voice assistant; or the software program is a recording application, and the identification pattern of the software program is an avatar of a recordee; or the software program is a weather application, and the identification pattern of the software program is a display icon of the weather application.

Figure 37:
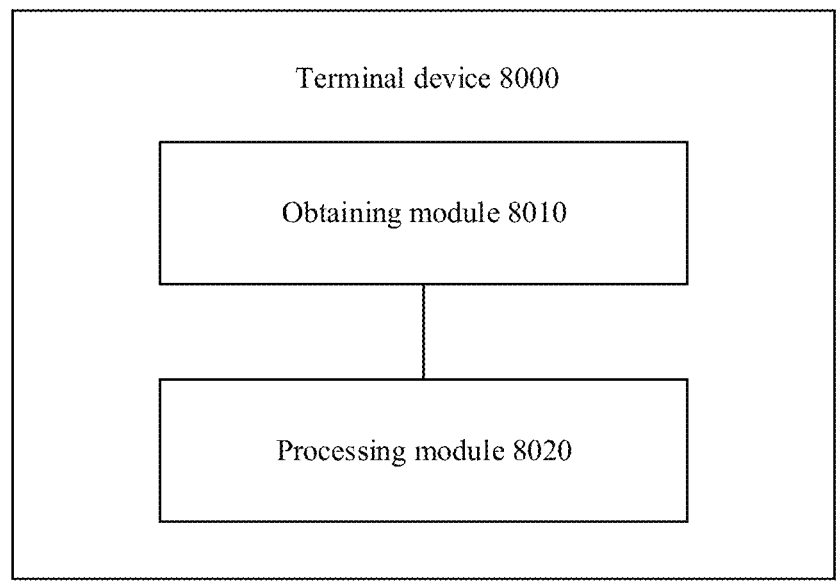
FIG. 37 is a schematic block diagram of a terminal device according to an embodiment of this application.

FIG. 37 is a schematic block diagram of a terminal device according to an embodiment of this application. The terminal device 8000 shown in FIG. 37 includes:

an obtaining module 8010, configured to: obtain a first image, where the first image is used to represent any one of a Chinese character, an English character, and an Arabic numeral character; and the first image is a hollow character image; and superimpose a dot-matrix image or a line image on the first image to obtain a superimposed image; and a processing module 8020, where the processing module 8020 is configured to:

move some pixels in a dot matrix or a line in the superimposed image by a preset distance to obtain a second image; and generate an identification pattern of the software program based on the second image.

In this application, the dot-matrix image or the line image is superimposed on the first image, so that the second image with more diverse display styles can be obtained, and further the identification pattern of the software program with more diverse display styles can be obtained based on the second image. This can improve a display effect of the identification pattern and user experience to some extent.

Optionally, in an embodiment, the identification pattern is an image of a hot spot of the second image, where the image of the hot spot of the second image is a sub-image in the second image from which a character represented by the second image can be recognized.

Optionally, in an embodiment, the software program is an address book, and the identification pattern of the software program is a contact avatar in the address book.

Optionally, in an embodiment, a density of dot matrices or lines in the identification pattern is positively correlated with a contact frequency and/or a degree of intimacy of a contact represented by the identification pattern.

Optionally, in an embodiment, a shade of color of the identification pattern is positively correlated with a contact frequency and/or a degree of intimacy of a contact represented by the identification pattern.

Optionally, in an embodiment, the software program is an album, and the identification pattern of the software program is a pattern of an album cover; or the software program is a memo, and the identification pattern of the software program is an identification pattern of memo information in the memo; or the software program is a music application, and the identification pattern of the software program is a cover of a playlist in the music application; or the software program is a voice assistant, and the identification pattern of the software program is a display icon of the voice assistant; or the software program is a recording application, and the identification pattern of the software program is an avatar of a recordee; or the software program is a weather application, and the identification pattern of the software program is a display icon of the weather application.

Figure 38:
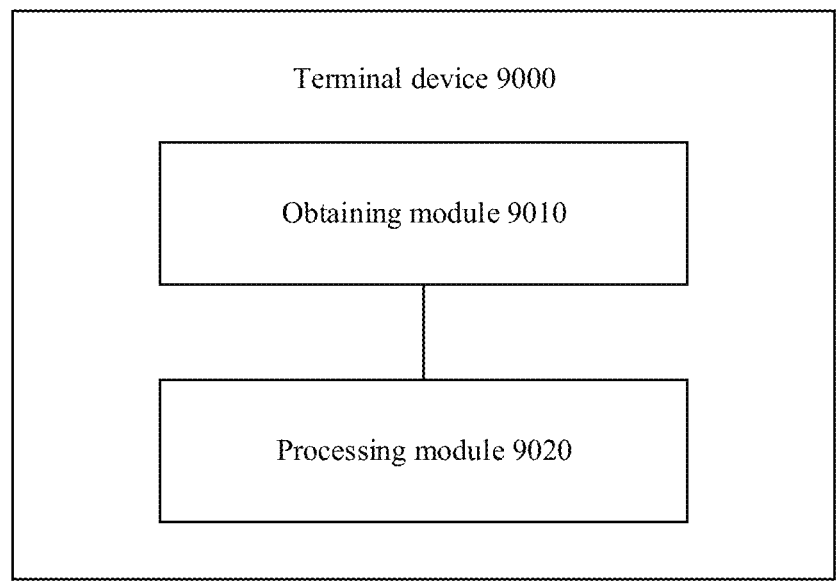
FIG. 38 is a schematic block diagram of a terminal device according to an embodiment of this application.

FIG. 38 is a schematic block diagram of a terminal device according to an embodiment of this application. The terminal device 9000 shown in FIG. 38 includes:

an obtaining module 9010, configured to obtain a first image, where the first image is used to represent any one of an English character, and an Arabic numeral character; and a processing module 9020, where the processing module 9020 is configured to:

determine a target picture that matches the first image from a picture library, where the target picture includes a reference image whose similarity with the first image is greater than or equal to a preset similarity; and generate an identification pattern of the software program based on the reference image.

In this application, a dot-matrix image or a line image is superimposed on the first image, so that a second image with more diverse display styles can be obtained, and further the identification pattern of the software program with more diverse display styles can be obtained based on the second image. This can improve a display effect of the identification pattern and user experience to some extent.

Optionally, in an embodiment, the identification pattern is an image of a hot spot of the reference image, where the image of the hot spot of the reference image is a sub-image in the reference image from which a character represented by the reference image can be recognized.

Optionally, in an embodiment, texture distribution of pictures in the picture library meets the characteristics of the Golden Mean or the Fibonacci sequence.

Optionally, in an embodiment, the software program is an album, and the identification pattern of the software program is a pattern of an album cover; or the software program is a memo, and the identification pattern of the software program is an identification pattern of memo information in the memo; or the software program is a music application, and the identification pattern of the software program is a cover of a playlist in the music application; or the software program is a voice assistant, and the identification pattern of the software program is a display icon of the voice assistant; or the software program is a recording application, and the identification pattern of the software program is an avatar of a recordee; or the software program is a weather application, and the identification pattern of the software program is a display icon of the weather application.

Figure 39:
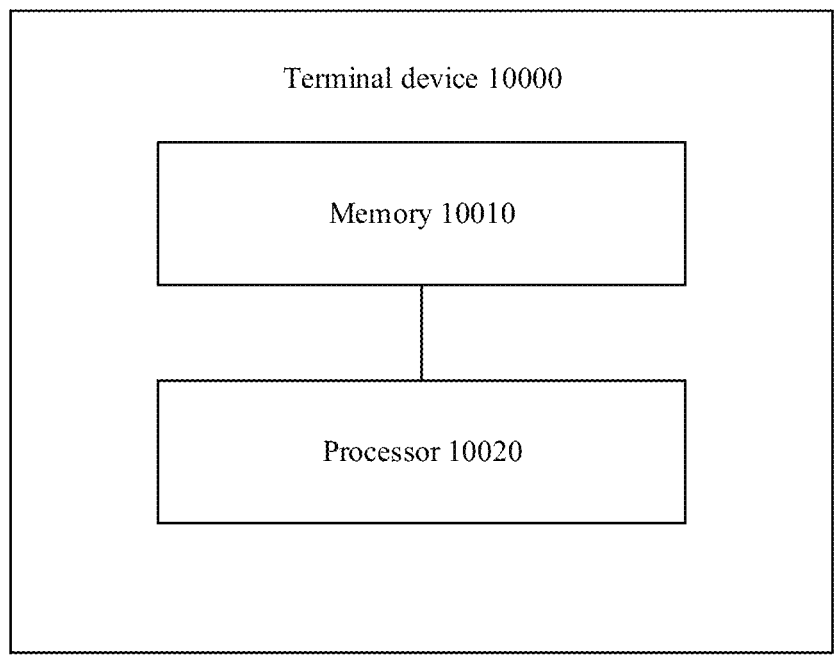
FIG. 39 is a schematic block diagram of a terminal device according to an embodiment of this application.

FIG. 39 is a schematic block diagram of a terminal device according to an embodiment of this application. The terminal device 10000 shown in FIG. 39 includes:

a memory 10010, configured to store a program; and a processor 10020, configured to execute the program stored in memory 10010, and when the program stored in memory 10010 is executed, the processor 10020 is configured to perform the steps of the method for generating an identification pattern in the embodiments of this application.

It should be understood that the obtaining module 7010 and the processing module 7020 in the terminal device 7000 are equivalent to the processor 10020, the obtaining module 8010 and the processing module 8020 in the terminal device 8000 are equivalent to the processor 10020, and the obtaining module 9010 and the processing module 9020 in the device 9000 are equivalent to the processor 10020.

Figure 40:
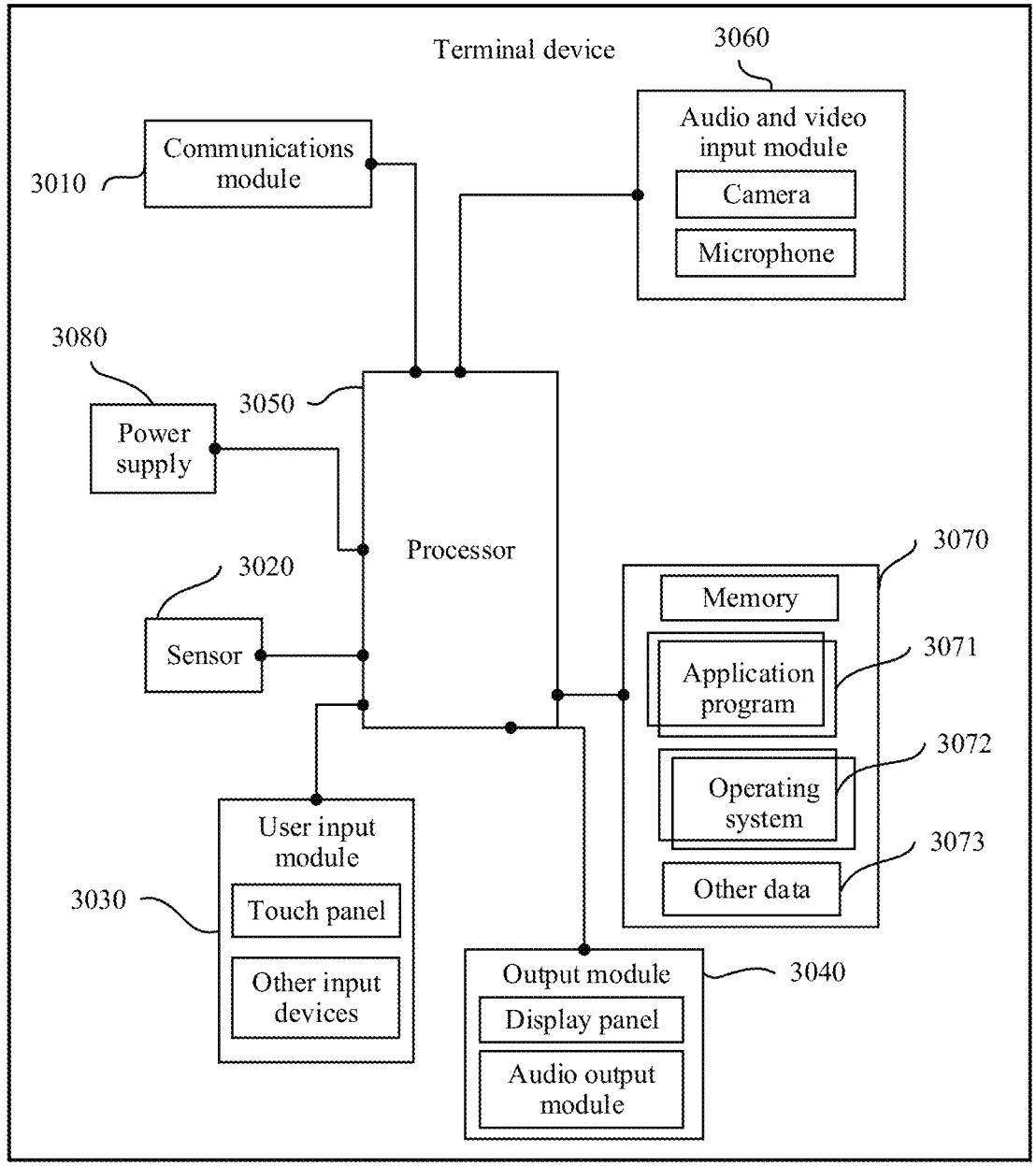
FIG. 40 is a schematic structural diagram of a terminal device according to an embodiment of this application.

FIG. 40 is a schematic structural diagram of a terminal device according to an embodiment of this application.

It should be understood that the specific structures of the terminal device 7000, the terminal device 8000, the terminal device 9000, and the terminal device 1000 shown in FIG. 36 to FIG. 39 may be as shown in FIG. 40.

The terminal device in FIG. 40 includes a communications module 3010, a sensor 3020, a user input module 3030, an output module 3040, a processor 3050, an audio and video input module 3060, a memory 3070, and a power supply 3080. The terminal device shown in FIG. 40 may perform all the steps of the method for generating an identification pattern according to the embodiments of this application. Specifically, the processor 3050 in the terminal device shown in FIG. 40 may perform the steps of the method for generating an identification pattern according to the embodiments of this application.

The following describes the modules of the terminal device in FIG. 40 in detail.

The communications module 3010 may include at least one module that enables the terminal device to communicate with another terminal device. For example, the communications module 3010 may include one or more of a wired network interface, a broadcast receiving module, a mobile communications module, a wireless internet module, a local area communications module, and a location (or positioning) information module.

The sensor 3020 may sense some operations of a user, and the sensor 3020 may include a distance sensor, a touch sensor, and the like. The sensor 3020 may sense operations of touching a screen, approaching a screen, or the like of the user.

The user input module 3030 is configured to receive input digital information, character information, or a contact touch operation/a non-contact gesture, and receive signal input related to user settings and function control of a system. The user input module 3030 includes a touch panel and/or other input devices.

The output module 3040 includes a display panel, configured to display information input by the user, information provided for the user, various menu interfaces of the system, or the like. Optionally, the display panel may be configured in the form of a liquid crystal display (liquid crystal display, LCD), an organic light-emitting diode (organic light-emitting diode, OLED), or the like. In some other embodiments, the touch panel may cover the display panel to form a touch display screen. In addition, the output module 3040 may further include an audio output module, an alarm, a tactual module, and the like.

The audio and video input module 3060 is configured to input an audio signal or a video signal. The audio and video input module 3060 may include a camera and a microphone.

The power supply 3080 may receive external power and internal power under the control of the processor 3050, and provide power required by the various modules of the terminal device during running.

The processor 3050 may indicate one or more processors. For example, the processor 3050 may include one or more central processing units, or include a central processing unit and a graphics processing unit, or include an application processor and a coprocessor (for example, a micro control unit or a neural network processor). When the processor 3050 includes a plurality of processors, the plurality of processors may be integrated on one chip, or each may be an independent chip. One processor may include one or more physical cores, where the physical core is a smallest processing module.

The memory 3070 stores a computer program, and the computer program includes an operating system program 3072, a software program 3071, and the like. Typical operating systems are, for example, systems used for desktop or notebook computers, such as Windows of Microsoft and MacOS of Apple, or systems used for mobile terminals, such as the Linux®-based Android (Android®) system developed by Google. When the apparatus in the embodiments of this application is implemented by software, it may be considered to be specifically implemented by the software program 3071.

The memory 3070 may be one or more of the following types: a flash (flash) memory, a hard disk type memory, a micro multimedia card type memory, a card type memory (for example, SD or XD memory), a random access memory (random access memory, RAM), a static random access memory (static RAM, SRAM), a read-only memory (read only memory, ROM), an electrically erasable programmable read only memory (electrically erasable programmable read-only memory, EEPROM), a programmable read only memory (programmable ROM, PROM), a magnetic memory, a magnetic disk, or an optical disk. In some other embodiments, the memory 3070 may alternatively be a network storage device on the Internet, and the system may perform an operation such as updating or reading on the memory 3070 on the Internet.

The processor 3050 is configured to read the computer program in the memory 3070 and execute the terminal device defined by the computer program. For example, the processor 3050 reads the operating system program 3072 to run the operating system on the system and implement various functions of the operating system, or reads one or more software programs 3071 to run an application on the system.

For example, the foregoing memory 3070 may store a computer program (the computer program is a program corresponding to the apparatus in the embodiments of this application), and when the processor 3050 executes the computer program, the processor 3050 can execute the apparatus of the embodiments of this application.

The memory 3070 also stores other data 3073 besides the computer program. For example, the memory 3070 may store load characteristics of a frame drawing thread in the apparatus of this application, a load prediction value of the frame drawing thread, and the like.

A connection relationship between the modules in FIG. 40 is merely an example. The terminal device provided in any embodiment of this application may also be applied to terminal devices in other connection modes. For example, all modules are connected through a bus.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for generating an identification pattern, comprising:
obtaining a first image, wherein the first image represents a Chinese character, an English character, or an Arabic numeral character;
performing transformation on the first image based on a contour line of the first image to obtain a second image, wherein the second image comprises the first image and a plurality of contour lines;
generating an identification pattern of a software program based on the second image; and
causing a display to display the identification pattern in a screen of the software program,
wherein
the software program is an address book,
the identification pattern is a contact avatar of a contact in the address book,
at least one of (i) a density of the plurality of contour lines in the identification pattern or (ii) a shade of color of the identification pattern is positively correlated with at least one of (a) a contact frequency or (b) a degree of intimacy of the contact represented by the identification pattern,
the identification pattern is a part, rather than an entirety, of the second image, and the character is recognizable from said part of the second image.

2. The method according to claim 1, wherein
the performing the transformation on the first image comprises:
    extending an outer contour line of the first image further outwardly to obtain the second image, wherein the outer contour line of the first image is a contour line formed around a peripheral edge of the first image.

3. The method according to claim 1, wherein
the first image is a hollow character image, and
the performing the transformation on the first image comprises:
    extending an inner contour line of the first image towards an interior of the first image to obtain the second image, wherein the inner contour line of the first image is a contour line formed by a plurality of edges of the first image.

4. The method according to claim 1, wherein
the first image is a solid character image, and
the performing the transformation on the first image comprises:
    performing transformation on the first image to obtain a transformed first image, wherein the transformed first image is a hollow character image; and
    extending an inner contour line of the transformed first image towards an interior of the transformed first image to obtain the second image.

5. The method according to claim 1, wherein
the contour line of the first image is a right-angle contour line,
before the performing the transformation on the first image, the method further comprises:
    processing the contour line of the first image to obtain a processed first image, wherein a contour line of the processed first image is a rounded contour line, and
the performing the transformation on the first image comprises:
    performing transformation on the processed first image based on the rounded contour line to obtain the second image.

6. The method according to claim 1, further comprising:
hiding at least a region of the plurality of contour lines in the identification pattern.

7. The method according to claim 1, wherein
said obtaining the first image comprises
    identifying the first image as a region, rather than an entirety, of a picture in a picture library, the region matching the Chinese character, the English character, or the Arabic numeral character.

8. The method according to claim 7, wherein
said identifying the first image in the picture comprises using a trained neural network model.

9. The method according to claim 1, wherein
said performing the transformation comprises
    performing expansion processing to obtain an expanded white region around the first image; and
    extracting an outer contour line of the expanded white region around the first image.

10. The method according to claim 1, wherein
the address book has a plurality of contacts including the contact,
the plurality of contacts correspondingly has a plurality of contact avatars including the contact avatar,
the plurality of contact avatars includes the same identification pattern, except for the density of the plurality of contour lines or the shade of color, and
the method further comprises displaying the plurality of contact avatars in descending order of the density of the plurality of contour lines, or in descending order of the shade of color.

11. The method according to claim 1, wherein
the address book has a plurality of contacts including the contact,
the plurality of contacts has a same surname including the character,
the plurality of contacts correspondingly has a plurality of contact avatars including the contact avatar,
the plurality of contact avatars includes a same portion, rather than an entirety, of the character,
the character is recognizable from said portion included in the plurality of contact avatars,
the plurality of contact avatars correspondingly has different densities of the plurality of contour lines, or different shades of color, and
the method further comprises displaying the plurality of contact avatars in descending order of the different densities of the plurality of contour lines, or in descending order of the different shades of color.

12. A terminal device, wherein the terminal device comprises a display and a processor, the processor is configured to:
    obtain a first image, wherein the first image represents a Chinese character, an English character, or an Arabic numeral character,
    perform transformation on the first image based on a contour line of the first image to obtain a second image, wherein the second image comprises the first image and a plurality of contour lines,
    generate an identification pattern of a software program based on the second image, and
    cause the display to display the identification pattern in a screen of the software program,
wherein
the software program is an address book,
the identification pattern is a contact avatar of a contact in the address book,
at least one of (i) a density of the plurality of contour lines in the identification pattern or (ii) a shade of color of the identification pattern is positively correlated with at least one of (a) a contact frequency or (b) a degree of intimacy of the contact represented by the identification pattern,
the identification pattern is a part, rather than an entirety, of the second image, and
the character is recognizable from said part of the second image.

13. The method according to claim 6, wherein
the hidden region is a circular region in the identification pattern,
the circular region overlaps some contour lines of the plurality of contour lines, and
portions of said some contour lines inside the circular region are not displayed in the identification pattern.

14. The terminal device according to claim 12, wherein
the processor is configured to hide at least a region of the plurality of contour lines in the identification pattern.

15. The terminal device according to claim 14, wherein
the identification pattern has a circular boundary,
the hidden region is a circular region in the identification pattern having the circular boundary, the circular region overlaps some contour lines of the plurality of contour lines, and
portions of said some contour lines inside the circular region are not displayed in the identification pattern.

16. A method for generating an identification pattern, comprising:
obtaining a first image, wherein the first image represents a Chinese character, an English character, or an Arabic numeral character;
performing transformation on the first image based on a contour line of the first image to obtain a second image, wherein the second image comprises the first image and a plurality of contour lines;
generating an identification pattern of a software program based on the second image; and
causing a display to display the identification pattern in a screen of the software program,
wherein
the screen of the software program is a call screen during a call,
said method further comprises, during the call:
increasing a density of the plurality of contour lines being displayed in the call screen, in response to an increase of a duration of the call,
the identification pattern is a part, rather than an entirety, of the second image, and
the character is recognizable from said part of the second image.

* * * * *